United States Patent [19]

Nicholson

[11] Patent Number: 4,504,507
[45] Date of Patent: Mar. 12, 1985

[54] METHOD FOR PREPARING A TAR-DEPLETED LIQUID SMOKE COMPOSITION

[75] Inventor: Myron D. Nicholson, Lockport, Ill.

[73] Assignee: Union Carbide Corporation, Danbury, Conn.

[21] Appl. No.: 556,465

[22] Filed: Nov. 30, 1983

Related U.S. Application Data

[60] Division of Ser. No. 417,172, Sep. 14, 1982, Pat. No. 4,431,032, which is a continuation-in-part of Ser. No. 311,909, Oct. 16, 1981, abandoned.

[51] Int. Cl.³ .......................... A23L 1/232; A23L 1/27
[52] U.S. Cl. ..................... 426/533; 426/250; 426/540; 426/650
[58] Field of Search ............... 426/650, 533, 534, 250, 426/540, 652

[56] References Cited

U.S. PATENT DOCUMENTS

| | | | |
|---|---|---|---|
| 3,106,473 | 10/1963 | Hollenbeck | 426/650 |
| 3,663,237 | 5/1972 | Moller | 426/533 |
| 4,104,408 | 8/1978 | Chiu | 426/135 |
| 4,359,481 | 11/1982 | Smits et al. | 426/533 |

FOREIGN PATENT DOCUMENTS

| | | |
|---|---|---|
| 151768 | 9/1950 | Australia . |
| 1492639 | 1/1969 | Fed. Rep. of Germany . |

Primary Examiner—George Yeung
Attorney, Agent, or Firm—John C. LeFever; James L. Sonntag

[57] ABSTRACT

A tar-containing aqueous liquid wood smoke is at least partially neutralized under controlled temperature to form a tar-enriched fraction and a tar-depleted liquid smoke fraction, and the latter is used for food casing treatment to facilitate smoke coloring and flavoring of encased foodstuff during processing.

13 Claims, 7 Drawing Figures

METHOD FOR PREPARING A TAR-DEPLETED LIQUID SMOKE COMPOSITION

This application is a division of prior U.S. application: Ser. No. 417,172, filing date Sept. 14, 1982 now U.S. Pat. No. 4,431,032, which is a continuation-in-part of application Ser. No. 311,909, Oct. 16, 1981, now abandoned.

RELATED APPLICATIONS

U.S. application Ser. No. 417,171 entitled "Tar-Depleted Liquid Smoke," is filed contemporaneously with this application in the name of Herman Shin-Gee Chiu, U.S. application Ser. No. 417,173 entitled "Tar-Depleted Liquid Smoke Treatment of Food Casings" is also filed contemporaneously with this application in the name of Myron Donald Nicholson, and U.S. application Ser. No. 261,457 entitled "Liquid Coating Method and Apparatus" was filed May 7, 1981 in the names of Chiu et al., now U.S. Pat. No. 4,356,218, issued Oct. 26, 1982.

BACKGROUND OF THE INVENTION

1. Field of the Invention

This invention relates to: (a) a method for preparing tar-depleted liquid smoke composition from a tar-containing aqueous liquid smoke solution, (b) a tar-depleted smoke colored and smoke flavored tubular food casing, (c) a tar-depleted aqueous liquid smoke solution with smoke color, odor and flavor capability, and (d) a method for preparing a smoke colored and smoke flavored encased food product.

2. Description of the Prior Art

Tubular cellulosic food casings are used extensively for processing a great variety of meat products and other food items. The food casings are generally thin-walled tubing of various diameters prepared from reconstituted materials, such as regenerated cellulose. Cellulosic food casings may also be prepared with fibrous webs embedded in the wall thereof, such casings commonly being referred to as "fibrous food casings".

The many different recipes and modes of processing that are used by the processed food industry to suit different tastes, and even regional preferences, generally necessitate the use of food casings with a variety of characteristics. In some instances, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, such as frankfurters, bolognas and the like, beef rolls, hams and the like, are frequently removed from about the processed meat product prior to slicing and/or final packaging.

Surface appearance and flavor are important factors in the commercial and consumer acceptance of processed meat products, and a common feature of most varieties of such products involves the use of "smoking" for imparting characteristic flavor and color thereto. The "smoking" of food products is generally accomplished by the food processor subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions" that have been developed and used commercially by the food processor in the processing of many types of meat and other food products. For convenience, in this specification, the as-purchased "liquid smoke solutions" will be frequently referred to as "as-is" liquid smoke.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solutions" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor such as by spraying or dipping, also causes unwanted pollution and equipment corrosion problems for the food processor. In addition, encased sausages treated by application of the liquid smoke during commercial processing have been found to yield, after peeling the casing from the treated encased food product, sausages which are lacking in smoke color uniformity from sausage to sausage, and from batch of sausages to batch of sausages. What is even more undesirable, is the lack of uniformity of coloration which often appears on the surface of the same sausage, including light and dark streaks, light and dark blotches, and even uncolored spots which especially appear at the ends of sausages.

It has also been suggested, as for example disclosed in U.S. Pat. No. 3,330,669 to Hollenbeck, that application of a viscous liquid smoke solution to the inside surface of a deshirred tubular food casing by the food processor immediately prior to stuffing the casing with a sausage emulsion, results in preparation of processed food products that exhibit acceptable color and smoky flavor after cooking and removal of the casing. However, the Hollenbeck procedure has not been found practical and is not used commercially. The viscous liquid smoke solution disclosed by Hollenbeck is not practical for coating a casing on a high speed production line to produce a coated casing which can then be shirred by conventional methods and used as a shirred casing on an automatic stuffing machine. The high viscosity of the Hollenbeck coating solution limits the casing coating speed and, if a conventional method such as "slugging", also called "bubble coating", is used to coat the inside of the casing, the viscous Hollenbeck coating necessitates frequently cutting the casing open to replenish the slug of coating material within the casing, which results in short lengths of casing and thus makes continuous shirring impractical.

Heretofore, however, it has been found that providing casings which afford special treatment or structural characteristics to the food product can be more uniformly and economically accomplished by the casing manufacturer. This is especially true with the advent of, and wide commercial use of, automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casings. In U.S. Pat. No. 3,378,379 to Shiner et al., a "slugging" method is used for applying coating materials to the internal surface of large diameter casings. While such techniques and others have been used in preparing commercial quantities of a variety of coated food casings, including casings where liquid smoke is employed as a component in the coating composition, the casings produced thereby have been designed to meet particular commercial requirements and, to the best of my knowledge, none of the prior art coated casings disclosed have been known to successfully impart a satisfactory level of "smoke" flavor and color to a meat product processed therein. For example, in U.S. Pat. No. 3,360,383 to Rose et al., and in U.S. Pat. Nos. 3,383,223 and 3,617,312 to Rose, there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages, which properties would therefore limit the suitability thereof for many other casing applications.

The prior art patents teach the application of liquid smoke to the internal surface of a casing, but attempts by the instant inventor to internally coat casing during the manufacture thereof have been found to be costly and to limit the speed of a continuous high speed production line.

One solution to this problem as described and claimed in copending U.S. application Ser. No. 062,358 filed July 3, 1979 in the name of Herman Shin-Gee Chiu, involves treating the external surface of the food casing with an aqueous liquid smoke composition derived from natural wood. Chiu also discovered that when the food casing is cellulosic and formed of either non-fibrous gel stock or fibrous gel stock, the use of as-is highly acidic (pH of 2.0 to 2.5) aqueous liquid smoke results in the formation of a tarry deposit accumulating on the carrier rolls and the squeeze rolls of the smoke treatment unit, thereby eventually forcing shut-down of the treating system. It was discovered that this problem could be overcome by at least partially neutralizing the as-is liquid smoke to precipitate the tar, and then treating the cellulosic gel stock casing with the tar-depleted liquid smoke. Chiu discovered that contrary to the previous state-of-art belief, the tar-depleted liquid smoke surprisingly still possesses significant smoke coloring and flavoring capability, and this invention is described and claimed in his previously referenced U.S. application Ser. No. 417,171 "Tar-Depleted Liquid Smoke and Treated Food Casing", filed contemporaneously with this application.

One problem with the neutralization method of preparing the tar-depleted aqueous liquid smoke composition of the last-mentioned Chiu application is that the coloration capability or "staining power" of the wood-derived liquid smoke declines with increasing pH or neutralization.

One object of this invention is to provide a method for preparing tar-depleted liquid smoke from a tar-containing wood-derived liquid smoke which avoids at least part of the staining power loss normally experienced with neutralization.

Another object of this invention is to provide a tar-depleted aqueous liquid smoke solution with high capability for imparting smoke color, odor and flavor to food products.

Still another object of this invention is to provide a tar-depleted, smoke colored and smoke flavored tubular food casing with high capability for imparting smoke color, odor and flavor to food products encased therein, by treatment with the aforementioned solution in turn prepared by the aforementioned method.

A further object of this invention is to provide a method for preparing a smoke colored and smoke flavored food product within the aforementioned tar-depleted, smoke colored and smoke flavored tubular food casing.

Other objects and advantages of the invention will become apparent from the ensuing disclosure and appended claims.

SUMMARY OF THE INVENTION

In this invention a method is provided for the preparation of an aqueous liquid smoke composition in which a tar-containing aqueous liquid smoke solution, having an absorptive power (hereinafter defined) of at least about 0.25 at 340 nm. wave length, is provided at temperature below about 40° C. This tar-containing aqueous liquid smoke solution is at least partially neutralized by contacting a high pH constituent therewith in sufficient quantity to raise the pH of the smoke solution to a level above about 4, thereby forming a tar-enriched fraction and a tar-depleted liquid smoke fraction. The temperature of this solution is controlled during the neutralization so that the solution temperature does not rise above about 40° C. The tar-enriched fraction and the tar-depleted liquid smoke fraction are separated to recover the latter as the aqueous liquid smoke composition of the present invention.

The invention also includes a tar-depleted liquid smoke treated tubular food casing prepared by steps including the provision of a tar-containing aqueous liquid smoke solution at temperature below about 40° C., said smoke solution having an absorptive power of at least about 0.25 at 340 nm. wave length. This tar-containing aqueous liquid smoke solution is at least partially neutralized by contacting a high pH constituent therewith in sufficient quantity to raise the pH of the smoke solution to a level above about 4, thereby forming a tar-enriched fraction and a tar-depleted liquid smoke fraction. The temperature of this solution is controlled during the neutralization so that the solution temperature does not rise above about 40° C. The tar-enriched fraction and tar-depleted liquid smoke fraction are separated to recover the latter as a tar-depleted liquid smoke composition. A surface of a tubular food casing is treated with the tar-depleted liquid smoke composition in sufficient quantity to provide an absorptive index (hereinafter defined) of at least about 0.2 at 340 nm. wave length for the casing wall.

This invention further includes a tar-depleted liquid smoke composition with smoke color, odor and flavor capability, prepared by providing a tar-containing aqueous liquid smoke solution at temperature below about 40° C., said smoke solution having an absorptive power of at least about 0.25 at 340 nm. wave length. This aqueous liquid smoke solution is at least partially neutralized by contacting a high pH constituent therewith in sufficient quantity to raise the pH of the smoke solution to a level above about 4, and thereby form a tar-enriched fraction and a tar-depleted liquid smoke fraction. The temperature of the aqueous liquid solution is controlled during the neutralization so that the solution temperature does not rise above about 40° C. The tar-enriched fraction and a tar-depleted liquid smoke fraction are separated to recover the latter as the aqueous liquid smoke composition, with the neutralizing and simultaneous temperature controlling steps, and the separating step being performed so as to provide an aqueous liquid smoke composition with at least 50% light transmittance as determined by an analytical method which is disclosed hereinafter.

Still another aspect of this invention relates to a method for producing a smoke colored and smoke flavored foodstuff product including the steps of providing a tar-containing aqueous liquid smoke solution comprising a mixture of smoke color, odor and flavor constituents having an absorptive power of at least about 0.25 at 340 nm. wave length. The aqueous liquid smoke solution is at least partially neutralized by contacting a high pH constituent therewith in sufficient quantity to raise the pH of the smoke solution to a level above about 4 and thereby form a tar-enriched fraction and a tar-depleted liquid smoke fraction. The temperature of the aqueous liquid smoke solution is controlled during the neutralization so that the temperature does not rise above about 40° C. The tar-enriched fraction and tar-depleted liquid smoke fraction are separated and the latter is recovered as a tar-depleted liquid smoke composition. A surface of a tubular food casing is treated with the tar-depleted liquid smoke composition in sufficient quantity to provide an absorptive index of at least about 0.2 at 340 nm. wave length for the casing wall. The so-treated casing is stuffed with foodstuff, and the resulting encased foodstuff is processed so as to impart smoke color, odor and flavor to the encased foodstuff by transfer of smoke color and smoke flavor constituents from the casing to the encased foodstuff.

DESCRIPTION OF THE PREFERRED EMBODIMENTS

Figure 1:
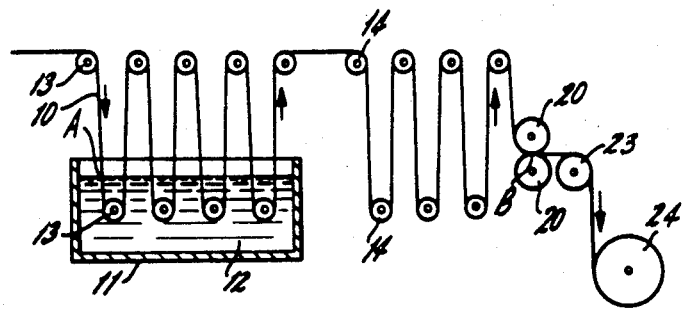
FIG. 1 is a schematic view of apparatus suitable for treatment of food casing external surface with tar-depleted liquid smoke in accordance with one embodiment of this invention.

Food casings that are suitable for use in the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without fibrous reinforcement, herein referred to as "non-fibrous" cellulosic casings.

Casings conventionally known as "dry stock casings" may be used in the practice of this invention. Such casings generally have a water content within the range of from about 5 to about 14 weight percent water if non-fibrous casing, or within the range of from about 3 to about 8 weight percent water if fibrous casing, based on the total weight of casing including water.

Casings conventionally known as "gel stock casings" are casings which have higher moisture contents since they have not been previously dried, and such casings may also be used in the practice of this invention. Gel stock casings, whether fibrous or non-fibrous, are the type exhibiting the aforementioned tarring problem when treated by as-is liquid smoke.

Smoke color, odor and flavor constituents suitable for use in accordance with the present invention are generally those designated as being the color, odor and flavor constituents of as-is liquid smoke.

The term "solution" as used herein is meant to encompass homogeneous true solutions, emulsions, colloidal suspensions and the like.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood char residue. Aqueous liquid smokes are generally very acidic, usually having a pH of 2.5 or less and a titratable acidity of at least 3% by weight.

Reference to the term "smoke color, odor and flavor constituents", as used throughout this specification and in the appended claims with respect to the liquid smoke compositions and casings of this invention, is intended to refer to, and should be understood as referring to, the smoke color, odor and flavor constituents derived from liquid smoke solutions in their commercially available form.

The tar-depleted liquid smoke composition of this invention is derived from natural wood smoke constituents. The source liquid smoke is generally produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturers are absorbed into the solution in a balanced proportion and the undesirable constituents may be removed. The resultant liquid smoke solution still contains a significant concentration of tars because the manufacturers and users consider the dark colored tars to be necessary from the standpoint of imparting smoke color and smoke flavor to foodstuffs. This smoke solution is representative of the whole spectrum of wood-derived smoke colors, odors and flavors that are available. The apparatus and method for manufacturing typical liquid smokes of the preferred type is more fully described in U.S. Pat. Nos. 3,106,473 to Hollenbeck and 3,873,741 to Melcer et al.

As used herein, the term "at least partially neutralized" is intended to refer to liquid smoke compositions having a pH greater than about 4, preferably having a pH within the range of from about 5 to about 9, and more preferably having a pH within the range of from about 5 to about 6.

The tar-depleted liquid smoke composition may be applied to the external surface of the tubular casing by passing the casing through a bath of the tar-depleted liquid smoke composition. The liquid smoke is allowed to contact the casing prior to doctoring off any excess liquid smoke by passing the casing through squeeze rolls, or wipers, and the like, for an amount of time sufficient for the casing to incorporate the desired amount of smoke coloring and flavoring constituents. The process of passing the casing through a treatment bath, also referred to in the art as a "dip bath" or a "dip tank," may also be referred to in the art as a "dipping" step. The liquid smoke composition may alternatively be externally applied to the casing by methods other than dipping, such as spraying, brushing, roll-coating, and the like.

Alternatively, the tar-depleted liquid smoke composition may be applied to the internal surface of the casing by any of several well-known procedures described in U.S. Pat. No. 4,171,381 to Chiu, the disclosure of which is incorporated by reference. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

It may then be shirred by conventional methods, or prior to shirring, it may be dried and/or humidified to a water content suitable for shirring and/or further processing. The need for conventional drying and/or humidification after the preferably external tar-depleted liquid smoke treatment depends on the water content of the casing after treatment and the type of casing. If the casing is a non-fibrous casing, a water content within the range of from about 8 weight percent to about 18 weight percent water immediately before shirring is typical, and for fibrous casing a water content within the range of from about 11 weight percent to 35 weight percent water immediately before shirring is typical, where percent is based on the total weight of casing including water.

One method of treating the casing with the tar-depleted liquid smoke of this invention is shown in FIG. 1. In FIG. 1, a flattened, tubular, cellulosic sausage casing 10, is externally treated with a tar depleted liquid smoke composition during its passage over lower and upper guide rolls 13 through dip tank 11 which contains the tar-depleted liquid smoke composition 12. The casing passes over lower and upper guide rolls 14 after exiting the dip tank, and then passes between squeeze rolls 20 which minimize any excess carry-over of the liquid smoke composition. The total contact time of the casing 10 with the tar-depleted liquid smoke composition 12 in the dip tank 11, and with excess liquid smoke composition on the casing passing over the guide rolls 14 before the casing passes through the squeeze rolls 20, will determine the amount of smoke coloring and flavoring constituents of the tar-depleted liquid smoke composition that the casing will incorporate. The total contact time is measured from point A to point B in FIG. 1. After the casing passes through squeeze rolls 20, it passes over guide roll 23 and is wound up on reel 24. The casing is then sent on to conventional further processing, including conventional humidification, as may be required, and conventional shirring.

Figure 2:
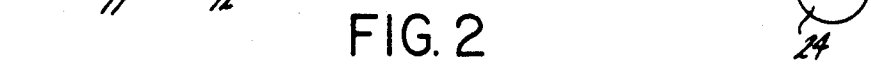
FIG. 2 is a schematic view of apparatus similar to and performing the same function as the FIG. 1 apparatus, but with a chamber for partially drying the tar-depleted liquid smoke treated casing to a desired moisture content while in an inflated condition.

The embodiment illustrated in FIG. 2 differs from that illustrated in FIG. 1, in that in FIG. 2 the casing after passing through squeeze rolls 20 is passed into a heating and drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on reel 24. The casing is then sent on to conventional further processing, including conventional humidification, as may be required, and conventional shirring.

Figure 3:
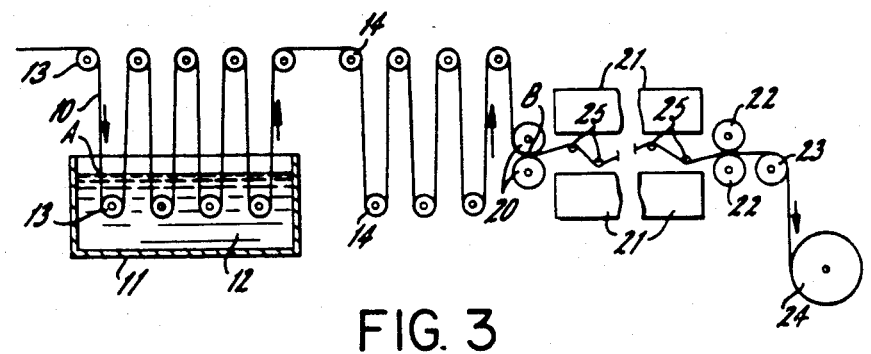
FIG. 3 is a schematic view of apparatus similar to and performing the same function as the FIG. 2 apparatus but with means for partially drying the tar-depleted liquid smoke treated casing while in a flat condition.

The embodiment illustrated in FIG. 3 differs from that illustrated in FIG. 2, in that in FIG. 3 the casing is dried in a flat condition while passing over guide rolls 25.

It is to be noted that the tar-depleted liquid smoke which is coated on the casing surface, whether externally coated or internally coated, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color gradation across the casing wall, with the smoke treated surface having a darker color than the surface on the opposite side of the casing wall. Accordingly, as used herein, the term "coating" is to be understood to mean that the casing wall is not only coated with smoke constituents but that the casing wall is also impregnated with smoke constituents.

The tar-depleted liquid smoke compositions of the present invention may also contain other ingredients which may be suitably used in treating a tubular food casing, to which the smoke constituents are applied, e.g., glycerine and/or propylene glycol which may be used as humectants or softening agents, and the like.

Other ingredients which are normally used in the manufacture of, or further treatment of the food casings, e.g., cellulose ethers and mineral oil, may also be present in the casing if desired, and they may be used in the same manner and amounts as if the tar-depleted liquid smoke treatment had not been used.

In particular, agents for improving the peelability of the casings from food products such as sausages, e.g., frankfurters, bolognas and the like, may be optionally coated on the internal surface of the casings before or after the external application of tar-depleted liquid smoke to the casing, and before or during shirring. If the tar-depleted liquid smoke is applied to the casing internal surface, the peelability agent is preferably applied first. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et al., the disclosure of which is incorporated herein by reference; "Aquapel" a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon", an E. I. duPont de Nemours Co., Inc. trademarked product which is a fatty acid chromyl chloride, the use of which is further disclosed in U.S. Pat. No. 2,901,358 issued Aug. 25, 1959 to Underwood et al., the disclosure of which is incorporated herein by reference.

If a fibrous casing is externally treated with an at least partially neutralized tar-depleted liquid smoke, carboxymethyl cellulose or other water soluble cellulose ethers are coated after liquid smoke treatment, but "Aquapel" or "Quilon" may be coated on the internal surface of the casing to improve peeling properties, either before or after tar-depleted liquid smoke treatment. If a non-fibrous casing is externally treated with an at least partially neutralized tar-depleted liquid smoke then, carboxymethyl cellulose or other water soluble cellulose ethers are the preferred materials to be coated on the internal surface of the casing to improve peeling properties.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

Casings may be prepared according to this invention, which are suitable for the processing of what is conventionally known in the art as "dry sausages." Unlike other types of non-fibrous and fibrous casings which are preferably easy to peel from the food product, either by the food processor before sale to the customer or by the consumer, "dry sausage" casing preferably adheres to the food product during and after processing. "Kymene," a Hercules, Inc. trademarked product which is a polyamide epichlorohydrin resin, the use of which is further disclosed in U.S. Pat. No. 3,378,379 issued April 16, 1968 to Shiner et al., the disclosure of which is incorporated herein by reference, may be internally coated on the internal surface of a casing treated with tar-depleted liquid smoke by the method of this invention, to improve the adhesion of the casing to food products processed therein.

The at least partial neutralization step of this invention may be accomplished by mixing either a highly alkaline solid with the tar-containing liquid smoke, as for example $CaCO_3$, $NaHCO_3$, $Na_2CO_3$ soda-lime mixture, and NaOH pellets or flake, or by mixing a high pH liquid such as aqueous NaOH solution. However, the carbonate and bicarbonate solids produce violent foaming, which may cause operational difficulties, and they, therefore, are not preferred. Although an aqueous base such as 50% NaOH may be used, tests have shown that at least partial neutralization with solid NaOH yields a liquid smoke which retains a higher percentage of the initial staining power of the as-is tar-containing liquid smoke. The lower staining power observed with aqueous NaOH neutralization is due in paft to the dilution incurred when using 50% caustic. By way of illustration, approximately 90–95% of the initial staining power of Royal Smoke AA liquid smoke (purchased from Griffith Laboratories, Inc.) can be retained when neutralizing with solid NaOH, as compared with the retention of 80–85% of the initial staining power when neutralizing with aqueous 50% NaOH. Since NaOH pellets are more difficult to dissolve than flake, NaOH flake is the preferred physical form of the neutralizing agent.

By way of illustration, based on a 110 gallon batch of Royal Smoke AA as-purchased (as-is) liquid smoke having a pH of 2.5, thirty four pounds (15.4 kg) of water is produced when solid NaOH is the partial neutralization agent and the desired pH is 6.0. In comparison, 109 pounds (49.4 kg) of water results when aqueous 50% NaOH is used, which is about a 200% increase. Assuming the as-is tar-containing liquid smoke is 70% by weight water, solid NaOH yields a partially neutralized tar-containing liquid smoke of 68% water, versus 70% water when using aqueous 50% NaOH for partial neutralization.

The rate of base material addition to the tar-containing liquid smoke depends on the cooling capacity of the mixing container as well as the efficiency of the mixing means, as will be understood by those skilled in the art. As will be demonstrated by ensuing examples, the staining power of the at least partially neutralized and tar-depleted liquid smoke is not substantially affected by temperature variations during the at least partial neutralization step, as long as the temperature of the bulk liquid is maintained below about 30° C.

The mixing container should be cooled by indirect means, as for example, brine circulating through immersed coils in a closed-circuit refrigeration system. The reason for indirect rather than direct contact between the refrigerant and the liquid smoke is to avoid contamination of the latter.

By way of illustration, and based on a 125 gallon (473 liter) capacity cylindrical container of 31 inches (78.7 cm) diameter and 42 inches (107 cm) height, with a "Lightnin" submerged propeller-type mechanical mixer (manufactured by Mixing Equipment Company, Rochester, NY), and with brine-containing immersed cooling coils as part of a refrigeration system having a cooling capacity of 5 tons (17,600 joules/sec), the addition of fifteen pounds (6.80 kg) of NaOH flakes per hour for five hours is suitable for partially neutralizing a 110 gallon 416 liter batch of Royal Smoke AA from a pH of 2.5 to a pH of 6.0 while maintaining the temperature below 30° C.

Another possible method for at least partially neutralizing the tar-containing liquid smoke is by contacting the latter with an ion-exchange material.

The invention will be more clearly understood by reference to the following examples which are set forth as being merely illustrative of the invention and which are not intended, in any manner, to be limitative thereof. Unless otherwise indicated, all parts and percentages are by weight and all casing related percentages are based on the total weight of the casing. Commercially available as-is liquid smokes useful in the practice of this invention include certain grades of both "Charsol" purchased from Red Arrow Products Co. and "Royal Smoke" purchased from Griffith Laboratories, Inc.

EXAMPLE I

This example illustrates the preparation of a tar-depleted liquid smoke composition of this invention. To (980 lb, 416 liter, 445 kg) of Royal Smoke AA as-is liquid smoke solution, at a pH of 2.5 and having an absorptive power of about 0.65 at 340 nm. wave length, 73 lbs. 33.1 kg of flake NaOH was added at the rate of 2 lbs/minute (0.91 kg/min). The vessel was stirred continuously and cooled with a chilled brine jacket. The temperature varied in the range of 14°-17° C. during the processing. Upon completion of the partial neutralization to a pH of 6.0, the stirring was stopped and the tars were allowed to settle overnight. The tar precipitate and the tar-depleted supernatant liquid were gravity separated and the latter was subsequently filtered through a sub-micron filter cartridge. The resulting aqueous liquid smoke composition was substantially tar-free as determined by a qualitative water compatibility test in which liquid smoke was mixed with water and observed for tar precipitation or lack thereof. There was no visible precipitation of tar. The chemical compositions of the as-is liquid smoke and the tar-depleted liquid smoke of this Example are shown in Table A.

TABLE

Chemical Comparison* of Commercially Available Liquid Smoke and Tar-Depleted Liquid Smoke Composition of this Invention

| | Phenols mg/g | Carbonyls mg/g | Total Acid Content % |
|---|---|---|---|
| As-is liquid smoke (pH 2.4) | 5.2 | 71 | 11.5 |
| Tar-Depleted liquid smoke (pH 6.2) | 3.5 | 120 | 14.6 |

*Numbers are arithmetic averages of multiple determinations

Table A shows that the tar-depleted aqueous liquid smoke composition prepared in accordance with this invention has a substantially different chemical character from the as-is tar-containing aqueous liquid smoke. It will be noted that the phenol content is somewhat less, but the carbonyl and total acid content of the tar-depleted liquid smoke are both apparently higher than the corresponding values for the original tar-containing liquid smoke. A possible explanation is that, constituents such as carbonyls and acids, which are highly volatile in the free state (pH of 2) but not as volatile in their salt form (pH of 6), may be lost partially in the analytical procedure where sample preparation involves distillation and recovery. The procedure for determining total acid content is the steam distillation-titration technique described hereinafter. The procedures for determining phenol and carbonyl content in liquid smoke are as follows.

Determination of Phenol and Carbonyl Content of Liquid Smoke

For sample preparation, all samples are filtered through Whatman No. 2 filter paper or equivalent, and refrigerated upon receipt or after preparation until the time of analysis to avoid possible polymerization. Distilled water is used for all dilutions. The samples are diluted with water in two steps, beginning with a 10 ml. quantity. In the first step the dilution is to a total volume of 200 ml., and in the second step 10 ml. of the first solution is further diluted to a total volume of 100 ml. For phenol determination, 5 ml. of the second solution is further diluted in a third step with distilled water to a total volume of 100 ml. For carbonyl determination, 1 ml. of the second solution is further diluted with carbonyl-free methanol to a total volume of 10 ml.

For the phenol determination the reagents are:

1. Boric acid-potassium chloride buffer pH 8.3. Dilute the indicated quantities of the solution to 1 liter with water.

0.4 M Boric Acid—125 ml.
    0.4 M Potassium chloride—125 ml.
    0.2 M Sodium hydroxide—40 ml.

2. 0.6% NaOH

3. Color reagent-N-2,6-trichloro-p-benzoquinoneimine

Stock solution: Dissolve 0.25 gm. in 30 ml. methanol and keep in refrigerator.

4. 2,6-Dimethoxyphenol standards

Prepare solutions of 1 to 7 micrograms/ml. of DMP in water for standard curve.

This procedure for phenol determination is a modified Gibbs method based on the procedure described in Tucker, I. W. "Estimation of Phenols in Meat and Fat", JAOAC, XXV, 779 (1942). The reagents are mixed together in the following order:

1st—5 ml. of pH 8.3 buffer.
2nd—5 ml. of dilution of unknown diluted liquid smoke, or of standard 2,6-dimethoxyphenol solution, or 5 ml. of water for blank.
3rd—Adjust pH to 9.8 using 1 ml. of 0.6% NaOH.
4th—Dilute 1 ml. of color reagent stock solution to 15 ml. in water. Add 1 ml. of diluted color reagent. Prepare just before adding.
5th—Allow color to develop for exactly 25 minutes at room temperature.
6th—Determine absorbance at a wave length of 580 nm in a 1 cm colorimeter tube with a Spectronic 20 or equivalent.
7th—Prepare a standard curve using absorbance as the abscissa and standard concentrations as the ordinate. Extrapolate concentration of DMP in liquid smoke dilutions from this curve.
8th—Calculate mg DMP/ml liquid smoke using the following equation:

$$\frac{\text{ppm DMP (from std. curve)} \times \text{(dilution factor)} \times 0.001 \text{ mg/}\mu\text{g}}{\text{ml of original liquid smoke sample}} = \text{mg DMP/ml liquid smoke}$$

To calculate mg DMP/g liquid smoke, divide result of above equation by the weight (g) of 1 ml. of liquid smoke.

For carbonyl determination, the reagents are:

1. Carbonyl-free methanol. To 500 ml. of methanol add 5 gm. of 2,4-dinitrophenylhydrazine and a few drops of concentrated HCl. Reflux three hours, then distill.
2. 2,4-Dinitrophenylhydrazine solution. Prepare saturated solution in carbonyl-free methanol using twice recrystallized product. Store in refrigerator and prepare fresh every two weeks.
3. KOH solution. Add 10 gm. of KOH solid to 20 ml. of distilled $H_2O$ and dilute to 100 ml. with carbonyl-free methanol.
4. 2-Butanone standard. Prepare solutions of 3.0 to 10 mg. of 2-butanone in 100 ml. carbonyl-free methanol for a standard curve.

The procedure is a modified Lappan-Clark method based on the procedure described in their article "Colorimetric Method for Determination of Traces of Carbonyl Compounds", Anal. Chem. 23, 541–542 (1959). The procedure is as follows:

1st—To 25 ml. volumetric flasks containing 1 ml. of 2,4-dinitrophenylhydrazine reagent (prewarmed to insure saturation) add 1 ml. of diluted liquid smoke solution, or 1 ml. of standard butanone solution, or 1 ml. of methanol (for reagent blank).

2nd—Add 0.05 ml. of concentrated HCl to all 25 ml. flasks, mix contents of each, and place in water bath for 30 minutes at 50° C.

3rd—Cool to room temperature and add 5 ml. KOH solution to each.

4th—Dilute contents of each flask to 25 ml. with carbonyl-free methanol.

5th—Read at 480 nm against methanol blank set at absorbance of 0, (cuvettes—0.5×4 in (10.2 cm) or equivalent). Use Spectronic 20, or equivalent.

6th—Plot absorbance versus 2-Butanone (MEK) concentration in mg. per 100 ml. for standard curve.

7th—Prepare a standard curve using absorbance as the abscissa and standard concentrations (mg MEK/100 ml.) as the ordinate. Extrapolate concentration of MEK in liquid smoke dilutions from this curve.

8th—Calculate mg MEK/100 ml. liquid smoke by the following equation:

$$\frac{\text{mg MEK (from std curve)} \times \text{(dilution factor)}}{100 \text{ ml}} = $$

mg MEK/100 ml liq smoke

To calculate mg MEK/9 liquid smoke, divide the result of the above equation by the weight (in grams) of 100 ml. of smoke.

EXAMPLE II

This example illustrates the treatment of non-fibrous cellulose casing by the method of this invention with the tar-depleted liquid smoke of Example I. For comparison, the same type of casing was treated in the same manner with the as-is tar-containing Royal Smoke AA liquid smoke.

Several non-fibrous frankfurter size gel stock casings were treated with the aqueous liquid smoke compositions of Example I by applying the liquid smoke solutions to the external surfaces of the casings. The applicator was a device which uniformly distributed the aqueous liquid smoke solution around the casings and comprised two main parts: the liquid smoke applicator and the smoothing unit. The smoke applicator consisted of a stationary foam disc mounted such that the liquid smoke entered at the outer edge. Tiny flexible plastic tubes conducted the liquid to the center core where the inflated casing was passed through. The foam disc flexes with casing sizes, thereby making it suitable for a range of casing cross-sectional areas. Because the liquid smoke application is not precisely uniform, a rotating smoothing device was used immediately after the applicator. It contained a rotating foam disc with a core size suitable for the casing size being processed. The disc was driven by an air motor at 200 to 250 rpm. Excess liquid smoke from the applicator and from the smoothing device was collected in a common sump and returned to the applicator inlet. The treated casings were moved through a point support-type assembly to and through a drying section. The aforedescribed coating and casing movement assembly is not part of the present invention but is claimed in previously referenced copending application Ser. No. 261,457, entitled "Liquid Coating Method and Apparatus", filed May 7, 1981 in the names of Chiu et al. and incorporated herein to the extent pertinent.

The treated casings were dried at 80° C. to a water content of 12 weight percent. The casings were then conventionally moisturized to 14–18 weight percent water, and shirred. Each of the treated casings contained about 10 mg/in$^2$ (1.55 mg/cm$^2$) of liquid smoke, and the phenols, carbonyls and total acid content present in the treated casings are shown in Table B. The procedure for measuring total acid content is the steam distillation technique described hereinafter.

TABLE B

| Chemical Comparison* of Non-Fibrous Cellulose Casings Treated with Liquid Smoke | | | |
|---|---|---|---|
| Casing Sample | Phenols mg/100 cm$^2$ | Carbonyls mg/100 cm$^2$ | Total Acid Content mg/100 cm$^2$ |
| Treated with as-is liquid smoke (pH 2.4) | 0.20 | 9.6 | 7.75 |
| Treated with tar-depleted liquid smoke (pH 6.0) | 0.15 | 6.4 | 15.8 |

*Numbers are arithmetic average of multiple determinations

Because of the nature of these experiments, the phenol reduction in the liquid smoke (Table A) and the phenol reduction in the coated casing (Table B) are not proportionate. As in the case of Table A, no conclusion can be drawn from my work with respect to the effect of this invention on carbonyl content or total acid content of the casing. Relative to the total acid content, the higher level in the partially neutralized and tar-depleted casing sample reflects the lower volatility of the salt form of the acids at higher pH. That is, the sodium acetate is not volatilized in the dryer and is nearly completely recovered whereas the acetic acid is volatilized.

Objective criteria have been used for comparison of the protein staining (color development) ability of the aqueous liquid smoke composition of this invention with the tar-containing liquid smoke from which it is derived. These criteria include the "Staining Power" as applied to the liquid compositions themselves, and the "Staining Index" as applied to the coating on the tubular food casing. In each instance, the tested embodiments of this invention demonstrated substantially the same staining ability as the original tar-containing liquid smoke, yet the tar content had been reduced to a level such that the heretofore experienced tar problems had been eliminated. Staining index is a reliable criterion for measuring the color development ability in casings of this invention which are freshly made, but as hereinafter discussed, Staining Index should not be used with aged casing. The procedure used for measuring staining power and staining index is as follows:

Staining Power and Staining Index Procedure

This procedure has as its basis the reaction encountered in meat processing in which the meat protein reacts with the smoke components, thereby imparting a desirable dark smoked color to the product. To quantify this staining or darkening power, the unknown smoke or freshly smoke treated casing is reacted with a specific amino acid (glycine) under acidic conditions at 70° C. for thirty minutes. The absorbance of the solution is measured at 525 nm. This procedure can be run on liquid smoke or liquid smoke treated casing with reproducible results. The detailed procedure is as follows:

I. Prepare a 2.5% solution of glycine in 95% acetic acid.
  (a) Dissolve 12.5 g of glycine in 25 ml of water in a 500 ml volumetric flask. Add enough glacial acetic acid to facilitate the dissolution.
  (b) Dilute to the prescribed level with glacial acetic acid.

II. In the case of liquid smoke analysis, weigh into a 15 ml test tube vial, 15–20 mg (±0.1 mg) of the liquid smoke to be evaluated, or III. In the case of smoke treated casing analysis, punch out four double thickness discs from the test casing to yield a total casing area of 2.0 in$^2$ (12.9 cm) for the eight discs.
  (a) If the casing is shirred, inflate a section with 10 psi 68,900 Pascals air to smooth the surface. Collapse the casing by drawing it over a hard surface, punch out the discs and add them to the vial.

IV. To the vials containing either the liquid smoke or the treated casing, add 5.0 ml of the 2.5% glycine/acetic acid solution.

V. Cap the vials, hand shake to assure contact of the sample, and place in a 70° C. oven for thirty minutes.

VI. Measure the absorbance at 525 nm for each solution using the glycine reagent as a blank.

VII. The absorbance is reported as the staining power of the liquid smoke or the staining index of the smoke treated casing.

The numerical value for staining index is the absorbance per 2 square inches 12.9 cm$^2$ of casing surface.

The staining power represents the ability of a liquid smoke to develop a certain absorbance or color under the staining index procedure, i.e., units absorbance per mg. liquid.

EXAMPLE III

A series of tests was performed in which as-is tar-containing liquid smoke was partially neutralized from an initial pH of 2.3 to a final pH of 6.0 under controlled temperature conditions and also uncontrolled temperature conditions. Staining power was determined at different neutralization temperatures and the data is summarized in the FIG. 4 graph for Royal Smoke AA liquid smoke (upper curve) and Charsol C-10 liquid smoke (lower curve).

More particularly, the as-is liquid smoke used for each test was partially neutralized by the addition of 50% NaOH with continuous mixing, and was cooled by means of an immersed coil-type portable refrigeration unit to remove the heat of solution and maintain the temperature of the liquid mixture at the desired level. After the required amount of base was added to reach the desired pH of 6.0, the tar precipitate was separated by gravity and the tar-depleted supernatant liquid was used for the staining power measurement.

Figure 4:
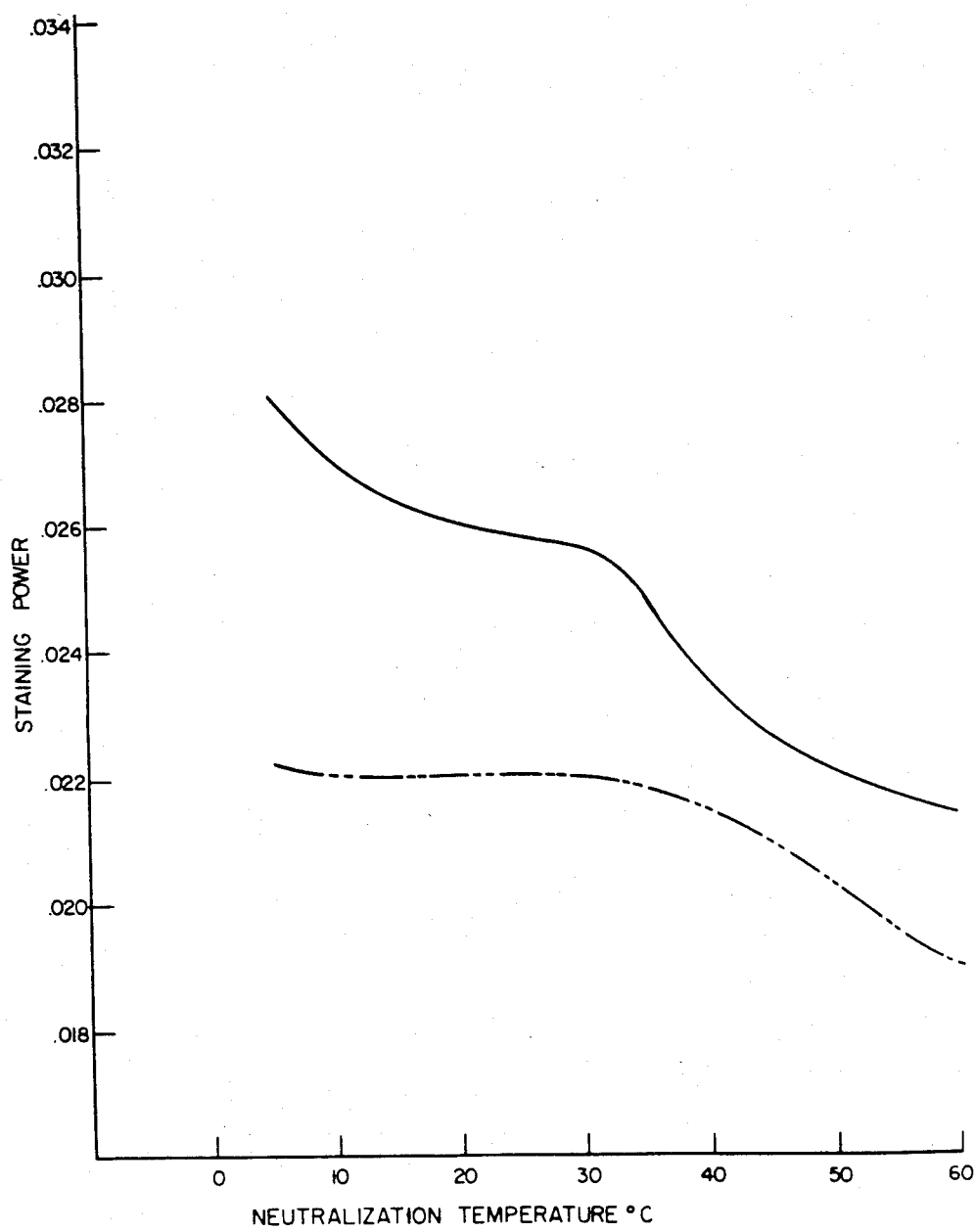
FIG. 4 is a graph showing tar-depleted liquid smoke staining power as a function of partial neutralization temperature.

Inspection of FIG. 4 reveals that the staining power of the partially neutralized Royal Smoke AA liquid smoke remains relatively constant at about 0.027 in the controlled temperature range of 5°–30° C., whereas the staining power of the partially neutralized Charsol C-10 liquid smoke remains substantially constant at about 0.022 in the same temperature range. At higher temperatures the staining power begins to diminish so that a temperature level of about 40° C. represents the upper limit for the method of this invention. For this particular series of tests and with uncontrolled temperature neutralization (no cooling), the maximum uncontrolled temperature reached by the liquid smoke mixture was about 60° C.

EXAMPLE IV

A series of tests was performed which illustrates the importance of at least partially neutralizing the as-is tar-containing liquid smoke (having an initial pH of about 2.3) to raise the pH to at least above 4 and preferably no higher than about 8. In these tests several different types of commercially available liquid smokes of different total acid contents were at least partially neutralized by the controlled addition of 50% NaOH liquid, and the temperature of the mixture was controllably maintained at about 15° C. during the mixing by employing an immersed coil-type portable refrigeration unit. Samples were removed at various pH values and their light transmittance was measured by adding 1 ml. of the liquid smoke to 10 ml. of water, mixing thoroughly and then measuring transmittance at 715 nm with a spectrophotometer. Percent light transmittance (relative to water) is inversely related to tar content of the tested liquid smoke, i.e., high tar content results in a cloudy liquid with low light transmittance. As used herein, "light transmittance" of aqueous liquid smoke refers to the latter's intrinsic light transmittance without addition of materials which may significantly affect the percent light transmittance.

Figure 5:
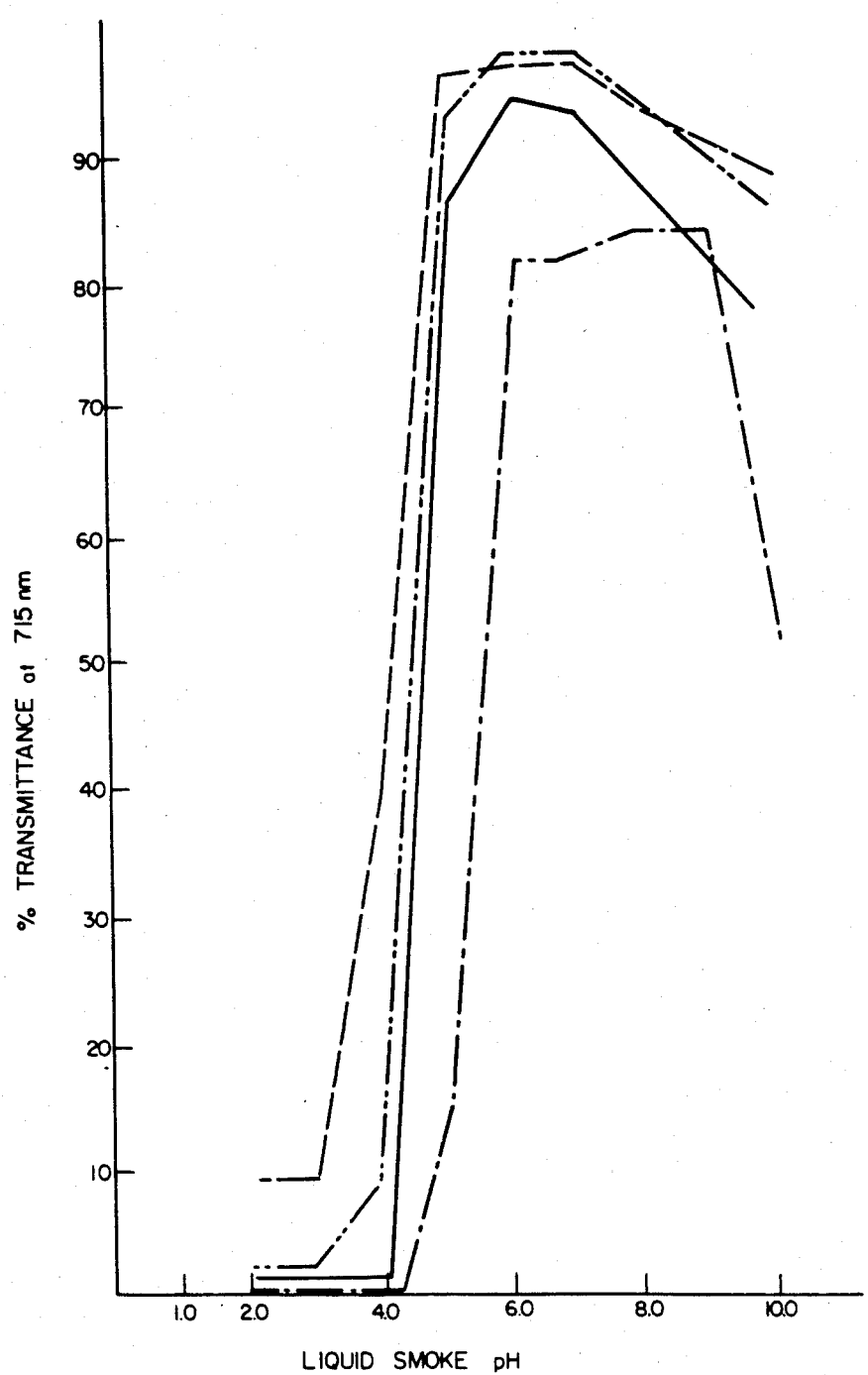
FIG. 5 is a graph showing tar-depleted liquid smoke light transmittance as a function of the composition pH.

The results of these light transmittance tests are plotted versus liquid smoke pH in FIG. 5, and the curves for the four types of liquid smoke used in these tests are as follows: Royal Smoke AA (full line), Royal Smoke B (dash line), Charsol C-12 (dash-dot-dash line), and Charsol C-10 (dash-dot-dot-dash line). FIG. 5 illustrates that with different wood-derived liquid smokes, the desired pH to achieve maximum transmittance (and tar precipitation) varies somewhat, but generally is above a pH of 4 and preferably is between a pH of 5 and 8. Above a pH of about 8 the tars tend to become resolubilized. However, since a light transmittance of at least 50% is considered to be the indicator showing that the tar removal from the liquid smoke is sufficient to enable the tar-depleted liquid smoke to be used without the danger of tar precipitation occurring during subsequent processing, it will be apparent that neutralization to a pH above 8 is suitable for several of the tested liquid smokes.

EXAMPLE V

Another series of tests was performed which demonstrates the difference between as-is tar-containing liquid smoke and the tar-depleted liquid smoke of this invention, in terms of cellulose casing haze. Samples of casing with each type of liquid smoke incorporated therein were immersed in water. During this period, the incorporated smoke reacted with the water. In the case of the tar-depleted samples, no incompatibility was measured but with the tar-containing samples the tar precipitated within the casing wall, and water incompatibility in the form of a cloudy haze was measured quantitatively.

Royal Smoke AA liquid smoke was used in these tests to treat the casing external surface with the as-is tar-containing liquid smoke and also with the tar-depleted liquid smoke in accordance with this invention. The latter was prepared by partial neutralization to a pH of 6.0 at 10°–15° C. in the Example I manner. A special coating was first sprayed on the casing internal surface for improved peelability. In this and succeeding Examples, the improved peelability solution was of the type described in Chiu et al., U.S. Pat. No. 3,898,348. The delivery rate was 3.0–5.0 mgs/sq.in. (0.46–0.77 mg/cm$^2$) of casing surface and the range of compositions used in this solution is listed in Table C.

TABLE C

| Improved Peelability Solutions |
|---|
| Carboxymethyl Cellulose - sodium salt (Hercules "CMC 7LF") 0.8–1.0% |
| Water 40.0–45.0% |
| Propylene Glycol 45.0–50.0% |
| Mineral Oil 5.0–10.0% |
| Polyoxyethylene sorbitan ester of higher fatty acids ("Tween 80") 0.5–1.25% |

The tar-depleted liquid smokes were separated from the tar precipitate and incorporated in the casing external surfaces by the procedure described in Example II. The liquid smoke was incorporated into each casing wall at a loading of about 10 mg/in$^2$ (1.55 g/cm$^2$).

The 21 mm. diameter nonfibrous treated casings were shirred and 36 inch (91.4 cm) long samples were taken randomly from a deshirred stick, inflated with air to minimize shirring wrinkles, and immersed in 200 ml. of deionized water. Immersion time was at least one hour but not more than three hours, i.e., only sufficient duration for complete moisture penetration of the casing wall. After blotting the samples dry, casing haze was measured using the general procedure outlined in ASTM Method D 1003, Volume 35, "Haze and Luminous Transmittance of Transparent Plastics" (1977). The results of these tests are summarized in Table D as follows:

TABLE D

| Type Smoke | Casing Haze No. Determinations | Haze Range Ave. |
|---|---|---|
| Haze | | |
| none (control) 7.9% | 32 | 6.0–9.7% |
| Tar-Depleted 6.7% | 32 | 5.9–8.5% |
| Tar-Containing 10.7% | 32 | 8.5–13.1% |

It is apparent from Table D that the average haze for the as-is tar-containing liquid smoke treated cellulose casing, is substantially higher than the average haze for the tar-depleted liquid smoke treated cellulose casing of this invention, such that the latter is only about 53.4% of the former. Average haze values are also a function of casing diameter and increase with increasing diameter because of the thicker casing wall. The absolute value for average haze further depends on the total acid content (or absorptive power as hereinafter discussed) of the particular smoke and the amount of smoke incorporated in the casing but, in general, the average haze for the cellulose casings of this invention is substantially lower than the average haze for cellulose casings treated with as-is liquid smoke, even though their smoke color, odor and flavor developing capabilities for encased foodstuff products are about the same when prepared under equivalent conditions. This relationship demonstrates the chemical and functional difference between the tar-depleted liquid smoke treated cellulose casings of this invention, and the as-is liquid smoke treated casing.

The haze test is only useful in characterizing the cellulose casings and not the fibrous casings of this invention. This is because fibrous casings are inherently opaque and have a very high average haze, e.g., about 97.5% for untreated fibrous casings.

EXAMPLE VI

A series of ultraviolet absorption spectroscopy tests was performed using tar-depleted liquid smoke treated cellulose food casing according to this invention and tar-containing as-is liquid smoke treated casing. These tests demonstrate the substantial difference between the two types of casings. The tests involved three different types of wood-derived liquid smokes: Charsol C-12, Royal Smoke AA and Royal Smoke B. In each instance the casing was a 21 mm. diameter cellulose casing having a coating of the previously described type on the internal surface for improved peelability. In each instance the tar-depleted liquid smoke of this invention was prepared from the as-is mixture by partial neutralization at 10°–15° C. to a final pH of 6.0, using the Example I procedure. The tar-depleted liquid smoke and the tar-containing liquid smoke were each applied to the casing exterior surface by the Example II procedure at a loading level of about 10 mg/in$^2$ (1.55 mg/cm$^2$).

The ultraviolet absorption spectrum over the 350 to 210 nm. range was recorded for liquid samples obtained from various smoke treated casings by way of the following procedure:

(a) A 100 in$^2$ (645 cm$^2$) sample of liquid smoke treated casing was submerged in 200 ml of anhydrous methanol for a period of about 1 hour and then removed.

(b) Depending on the liquid smoke loading, further dilution must be made for compatibility with the UV scanning equipment. In these instances the liquid smoke loading was about 10 mg/in$^2$ (1.55 mg/cm$^2$) of casing and the solution used for scanning comprised 4.96 ml. of methanol and 0.10 ml. of the extract from step (a).

(c) The UV spectrum was recorded in the 350 to 210 nm. range with the following format: 2 second response/2 mm slit, 10 nm./cm. chart, 50 nm/minute scan speed, and 0–200% transmittance scale. In order to measure the absorbance primarily due to tars present in the liquid smoke, the spectrophotometer was zeroed using an extract solution containing the lowest possible tar content. For any particular type of liquid smoke, this was an extracted and neutralized (pH 5.0) smoke treated casing extract sample. Once zeroed in this manner, any additional absorbance in the UV spectrum was a quantitative measure of the tarry components present.

Figure 6:
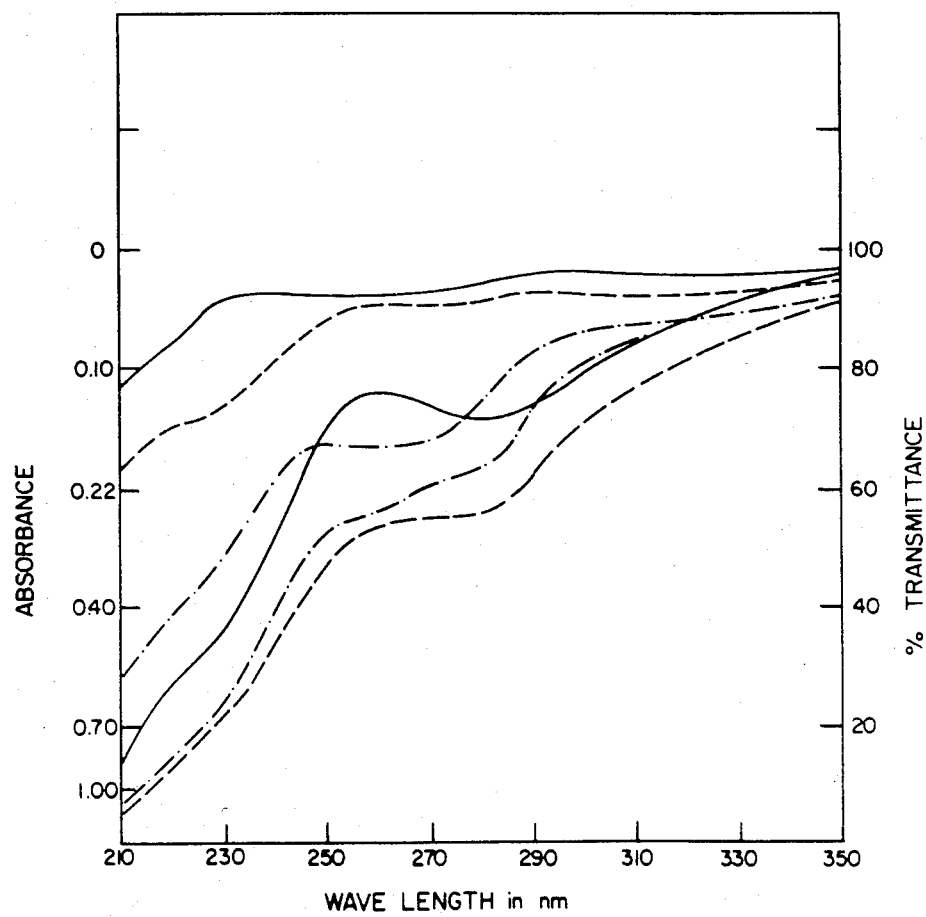
FIG. 6 is a graph showing ultraviolet transmittance and ultraviolet absorbance at various wave lengths for both as-is tar-containing liquid smoke and tar-depleted liquid smoke of this invention.

The results of these ultraviolet absorption tests are plotted in the FIG. 6 graph with the Charsol C-12 samples shown as solid lines, the Royal Smoke AA samples as dash lines, and the Royal Smoke B samples as dash-dot-dash lines. Inspection of these curves reveals that the greatest difference between the tar-depleted samples and the tar-containing samples occurs at about 210 nm. wave length although there is a substantial difference over the entire scanned range of wave lengths. The difference is greatest with liquid smokes of highest total acidity, highest absorptive power and highest tar content (Charsol C-12 and Royal Smoke AA). The ultraviolet absorbance difference is less for Royal Smoke B liquid smoke which has lower total acidity and lower tar content. The ultraviolet absorbance and percent light transmittance values at 210 nm. wave length are summarized in Table E, and show that the smoke extracts from the tar-depleted liquid smoke treated cellulose casings of this invention have an ultraviolet absorbance at 210 nm. wave length which is reduced by at least 52% compared to tne smoke extract from the corresponding tar-containing as-is liquid smoke treated casing having the same total acid content and absorptive power.

TABLE E

Ultraviolet Comparisons at 210 nm Wave Length for Smoke Extracts from Smoke Treated Casings

| | Transmittance | Absorbance | Perceived Type of Reduction in Liquid Smoke Absorbance |
|---|---|---|---|
| Charsol C-12 | | | |
| Tar-Depleted | 80% | 0.10 | 89% |
| Tar-Containing | 14% | 0.85 | — |
| Royal Smoke AA | | | |
| Tar-Depleted | 62% | 0.21 | 83% |
| Tar-Containing | 6% | 1.22 | — |
| Royal Smoke B | | | |
| Tar-Depleted | 27% | 0.57 | 52% |
| Tar-Containing | 6% | 1.22 | — |

EXAMPLE VII

The external surfaces of 21 mm. diameter cellulose frankfurter casings were treated with the tar-depleted liquid smoke composition prepared in the manner of Example I using the Example II treatment procedure. For purposes of comparison, the same size casings untreated by liquid smoke solution were used with and without the aforedescribed enhanced peelability solution spray-coated on the inner surface of these control casings. All casings were stuffed with either an emulsion of the beef meats formulation of Table F or the high collagen meat formulation of Table G.

TABLE F

Beef Formulation

| Ingredients | Weight (kg) |
|---|---|
| Beef Chuck | 22.68 |
| Beef Plate | 22.68 |
| Salt | 1.13 |
| Water | 13.61 |
| Seasoning | 0.45 |
| Sodium Nitrite (Prague Powder) | 0.11 |

TABLE G

High Collagen Formulation

| Ingredients | Weight (kg) |
|---|---|
| Beef Chuck | 9.98 |
| Beef Tripe | 7.26 |
| Beef Shank | 7.26 |
| Beef Cheek | 7.26 |
| Regular Pork | 13.61 |
| Water | 9.98 |
| Salt | 1.13 |
| Seasoning | 0.45 |
| Sodium Nitrite (Prague Powder) | 0.11 |

The stuffed casings were processed under normal conditions of temperature and humidity as commercially practiced, but without the conventional step of smoke treatment. Processing conditions were sufficient to cause the transfer of smoke color, odor and flavor constituents from the casing to the frankfurters. The casings were peeled from the finished meat on a High Speed Apollo Ranger Peeling Machine. Two processing chambers were used for the two types of emulsions but they were programmed in the same manner to raise the temperature from 140° to 180° F. over a one-half hour period with 10% relative humidity. The meat product was cooked to an internal temperature of 155° F., (68° C.) and then cold water showered (47° F., 8° C.) for 10 minutes, followed by a ten minute chilled water shower (35° F., 1.6° C.). Promptly after this processing, colorimetric values were obtained using a Gardner XL-23 Colorimeter with a 1 cm aperture opening standardized with a white plate, all in accordance with standard operating procedures described in the instruction manual for the Gardner XL-23 Tristimulus Colorimeter, which is commonly used in the industry for the measurement of color and light intensity. Three locations on each of ten frankfurters from each meat formulation were selected for readings. Reading locations were approximately 1 inch (2.54 cm) from each frankfurter end and in the middle. Colorimetric "L" and "a" values were collected. The results of these peelability and colorimetric tests are summarized in Tables H and I.

TABLE H

Peelability Tests

| Sample No. and Description | No. Franks | No. Franks Peeled | No. Frank Unpeeled | Peelability % |
|---|---|---|---|---|
| H$_1$ Untreated control[1] | 104 | 19 | 85 | 18 |
| H$_2$ Untreated control with enhanced peelability[1] | 112 | 112 | 0 | 100 |
| H$_3$ Tar-depleted with enhanced peelability[1] | 256 | 253 | 3 | 99 |
| H$_4$ Untreated control[2] | 96 | 12 | 84 | 13 |
| H$_5$ Untreated control with enhanced peelability[2] | 128 | 128 | 0 | 100 |
| H$_6$ Tar-depleted sample with enhanced peelability[2] | 128 | 120 | 8 | 94 |

[1] Beef formulation.
[2] High collagen meat formulation.

TABLE I

Colorimetric Tests

| Samples | L* | ΔL | Std. Dev. | a** | Δa | Std. Dev. |
|---|---|---|---|---|---|---|
| $H_2$ | 46.46 | — | 0.77 | 16.23 | — | 0.39 |
| $H_3$ | 44.51 | −1.95 | 0.97 | 16.44 | +0.21 | 0.46 |
| $H_5$ | 51.88 | — | 0.87 | 13.04 | — | 0.37 |
| $H_6$ | 48.94 | −2.94 | 1.33 | 14.07 | +1.03 | 0.63 |

*"L" values represent light vs. darkness: the lower the value, the more dark the sample.
**"a" values represent redness: the higher the value, the more red the sample.

Analysis of Table H indicates that peelability of the beef formulation sample based on this invention (Sample $H_3$) was excellent with use of the enhanced peelability solution. Peelability of the high collagen meat formulation sample (Sample $H_6$) was good With use of the enhanced peelability solution. Analysis of Table I indicates that the frankfurter products made in tar-depleted liquid smoke-treated samples showed a darker and more red color than the frankfurter products made in casings which were untreated by liquid smoke solution.

EXAMPLE VIII

Staining powers were measured for various compositions which were aged at elevated temperatures (relative to the neutralization temperature during preparation) for periods of up to 25 days. In a first series of tests, as-is Royal Smoke AA liquid smoke and tar-depleted liquid smoke neutralized to a pH of 6.0 at various temperatures in the 5°–30° C. range were used and aged at 100° F. (38° C.). In a second series of tests, as-is Charsol C-10 and tar-depleted liquid smoke neutralized at various temperatures in the same temperature range were used and also aged at 100° F. (38° C.) for periods of up to 25 days. In a third series of tests, as-is Royal Smoke AA liquid smoke and tar-depleted liquid smoke neutralized at various temperatures in the 5°–30° C. range, were aged at 70° C. for periods of up to 25 days. In a fourth series of tests, as-is Charsol C-10 and tar-depleted liquid smoke neutralized at various temperatures in the 5°–30° C. range were also used and aged at 70° C. for periods of up to 22 days. The procedure for preparing the tar-depleted liquid smoke in these tests was the same as described in Example I, and the results of these tests are summarized in Table J.

Table J shows that the staining powers of as-is tar-containing liquid smokes are substantially constant, i.e., unaffected by elevated temperature aging. In contrast, the staining powers of the tar-depleted liquid smokes of this invention continuously decline during elevated temperature aging at 70° F. 21° C. and 100° F. 38° C. over periods of up to at least 25 days. This decline is at an approximately constant and linear rate, within the entire neutralization temperature range of 5°–30° C. These tests demonstrate the chemical difference between tar-containing liquid smokes and the tar-depleted liquid smokes of this invention.

TABLE J

Effect of Elevated Temperature Aging on Staining Power

| Type of Smoke | Aging Temperature | Staining Power | | | | | |
|---|---|---|---|---|---|---|---|
| | | Original | 5 days | 10 days | 15 days | 20 days | 25 days |
| As-is Royal Smoke AA | 38° C. | 0.032 | 0.032 | 0.032 | 0.032 | 0.032 | 0.032 |
| Royal Smoke AA neutralized at 5–30° C.* | 38° C. | 0.026 | 0.022 | 0.019 | 0.015 | 0.012 | 0.009 |
| As-is Charsol C-10 | 38° C. | 0.025 | 0.025 | 0.025 | 0.025 | 0.025 | 0.025 |
| Charsol C-10 neutralized at 5–30° C.* | 38° C. | 0.020 | 0.010 | 0.016 | 0.013 | 0.011 | 0.008 |
| As-is Royal Smoke AA | 21° C. | 0.034 | 0.033 | 0.034 | 0.034 | 0.030 | 0.034 |
| Royal Smoke AA neutralized at 5–30° C.* | 21° C. | 0.027 | 0.024 | — | 0.026 | 0.022 | 0.022 |
| As-is Charsol C-10 | 21° C. | 0.024 | 0.024 | 0.024 | 0.024 | 0.024 | 0.024 |
| Charsol C-10 neutralized at 5–30° C.* | 21° C. | 0.022 | 0.021 | 0.020 | 0.018 | 0.017 | — |

*Average values for neutralization temperatuares of 5, 10, 15, 20 and 30° C.

EXAMPLE IX

A series of tests was conducted on smoke colored and smoke flavored food products encased in cellulose casings. In these tests the external surfaces of 21 mm. diameter cellulose casings were treated with as-is Royal Smoke AA liquid smoke and tar-depleted liquid smoke of this invention prepared by neutralization at 10°–15° C. to a pH of 6.0. The tar-depleted liquid smoke was prepared by the same procedure described in Example I, and the casings were treated with the liquid smokes by the procedure described in Example II. The casings were stuffed with a high collagen-content frankfurter meat emulsion and processed by the conventional steps of cooking, cold water showering and chilling. The colorimetric values were obtained with the same equipment used in Example VII and by the same procedure described in connection therewith. The results of these tests are summarized in Table K.

These tests indicate that even though the staining index of the tar-depleted smoke treated casings declined substantially during aging as compared with the as-is liquid smoke treated casings, the smoke color of the stuffed food product in the low staining index casing was unexpectedly quite satisfactory.

TABLE K
Effect of Elevated Temperature Aging on Color Development Capability

| Type of Smoke | Loading mg/cm² | Casing Fresh Staining Index | ΔL** of Frankfurter From Fresh Casing | Type of Aging | Casing Aged Staining Index | ΔL** of Frankfurter From Aged Casing |
|---|---|---|---|---|---|---|
| As-is Royal Smoke AA | 1.58 | 0.42 | 5.21 | 3 months at 40° C. | 0.36 | 3.89 |
| Royal Smoke AA neutralized at 10–15° C. | 1.30 | 0.34 | about 2*** | 3 months at 40° C. | 0.15 | 2.81 |
| Royal Smoke AA neutralized at 10–15° C. | 1.32 | 0.35 | 3.88 | accel.* | 0.18 | 2.38 |

*Accelerated aging at 50° C. for 72 hours.
**L values are frankfurter colorimetric measurements and ΔL is the difference (darker color) compared to a frankfurter sample not treated with liquid smoke.
***Estimated.

EXAMPLE X

All of the previously described tubular food casing treatment experiments involved cellulose non-fibrous casings, but the invention is also useful in treatment of cellulosic fibrous casings. In this experiment fibrous casing stock of about 6.3 inch flat width was treated with tar-depleted liquid smoke prepared from Royal Smoke AA as-is liquid smoke solution by the procedure outlined in Example I.

After winding on a reeler-mechanism, the untreated cellulosic fibrous casing was unwound and caused to move through a bath of the tar-depleted liquid smoke solution making only one dip, and immediately rewound on another reel. This procedure allowed the excess solution to be absorbed from the casing exterior surface and penetrate the casing wall while on the reel to provide the final treated casing. The dipping operation was conducted in a manner such that the casing interior surface was not in contact with the tar-depleted liquid smoke solution. Dwell-time in the solution was only a fraction of a second and the casing travel speed from reel-to-reel was about 350 feet/minute (107 m/min.). The reel-applied casing tension was about 10 lbs (44.5 Newtons). The estimated tar-depleted liquid smoke solution loading on the casing was about 24 mgs./sq. in. (3.7 mg/cm²) of casing surface. This particular method for manufacturing a liquid smoke-treated fibrous casing is not part of the present invention but is claimed in copending U.S. application Ser. No. 301,276 entitled "Liquid Smoke Impregnation of Fibrous Food Casings" filed Sept. 11, 1981 in the name of H. S. Chiu.

The so-treated fibrous casing stock was then shirred in a manner well known to those skilled in the art, and separate casing samples were then stuffed with ham and bologna and processed using conventional stuffing and processing methods, except that no smoke was applied in the smokehouse. The ham and bologna products had acceptable color, odor and flavor due to the transfer of smoke color, odor and flavor constituents from the smoke treated fibrous casing to the meat.

In a preferred embodiment of this invention, the tar-depleted liquid smoke composition is prepared from tar-containing aqueous liquid wood smoke solution having a total acid content (total acidity) of at least about 7 weight percent, and most preferably a total acid content of at least about 9 weight percent. Total acid content is a qualitative measure of the tar content and Staining power (previously defined) of as-is liquid wood smokes used by manufacturers. In general, higher total acid content means higher tar content. The same is true of the total solids content of as-is liquid smoke. The procedures used by liquid wood smoke manufacturers to determine total acid content and total solids are as follows:

Determination of Total Acid Content for Tar-Containing Liquid Smoke

1. Weigh accurately about 1 ml. of liquid smoke (filtered if necessary) in a 250 ml. beaker.
2. Dilute with about 100 ml. of distilled water and titrate with standard 0.1N NaOH to a pH of 8.15 (pH meter).
3. Calculate the total acid content as percent by weight of acetic acid, using the following conversion:

$$1 \text{ ml. } 0.1000N \text{ NaOH} = 6.0 \text{ mg. HAc}$$

Determination of Total Solids

The procedure for determination of total solids in liquid smoke is as follows:

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.
2. Dry for two hours at 105° C. in a forced draft oven, or for 16 hours at 105° C. in a conventional oven.
3. Cool to room temperature in a desiccator and weigh.
4. Calculate the total solids as percent by weight of the liquid smoke.

Table L lists the most commonly used and commercially available tar-containing aqueous liquid wood smokes along with their manufacturer-reported total acid content (total acidity). Total solids content, staining power, and percent light transmittance at 590 nm. are also reported for comparison. It will be noted from Table L that the as-purchased (as-is) wood smoke solutions with total acid content values less than about 7 weight percent have high light transmittance values greater than 50% and low staining power. Their tar content is so low that their water compatibility is high. Accordingly, there is no need to remove tar from such wood smoke solutions in accordance with this invention. Also, their staining powers are so low that they are not capable of performing the same smoke coloring and smoke flavoring function as the tar-depleted aqueous liquid smoke compositions of this invention. It should, however, be recognized that such low tar content as-is liquid smoke solutions may be concentrated as, for example, by evaporation, and the so-concentrated liquid smoke solution then may acquire the characteristics of a tar-containing liquid smoke which can be advantageously treated in the manner of this invention. That is, such concentrated tar-containing liquid smoke acquires higher total acidity, total solids, and staining power.

TABLE L

| | Commerically Available Liquid Wood Smokes | | | | |
|---|---|---|---|---|---|
| Manufacturers Designation | Total Acid[e] Content % | Total Solid % | % Light Transmittance | Staining Power | Absorptive Power[d] |
| Royal Smoke AA[a] | 11.5–12.0 | 10.2 | 0 | 0.034 | 0.68 |
| Royal Smoke A[a] | 10.5–11.0 | 9.0 | 0 | 0.029 | 0.42 |
| Royal Smoke B[a] | 8.5–9.0 | 8.8 | 0 | 0.025 | 0.36 |
| Royal Smoke 16[a] | 10.0–10.5 | 17.6 | 0 | 0.026 | 0.62 |
| Charsol C-12[b] | 12.0–12.5 | 8.3 | 0 | 0.031 | 0.54 |
| Charsol C-10[b] | 11.5 | not reported | 0 | 0.028 | 0.40 |
| Charsol X-11[b] | 10.0 | 5.8 | 0 | 0.022 | 0.36 |
| Charsol C-6[b] | 6.7 | 4.8 | 73 | 0.016 | 0.22 |
| Charsol C-3[b] | 3.6 | 1.0 | 98 | 0.007 | 0.12 |
| Smokaroma Code - 12[c] | 12.0 | 10.5 | 0 | 0.034 | — |
| Smokaroma Code - 10[c] | 10.2 | 5.1 | 0 | 0.027 | — |
| Smokaroma Code - 8[c] | 8.0 | 2.4 | 26 | 0.017 | — |
| Smokaroma Code - 6[c] | 6.2 | 1.9 | 75 | 0.014 | — |

[a]Griffith Laboratories, Inc., 12200 South Central Avenue, Alsip, Il.
[b]Red Arrow Products Co., P.O. Box 507, Manitowoc, WI.
[c]Meat Industry Suppliers, Inc. 770 Frontage Road, Northfield, Il.
[d]Measured at 340 nm.
[e]Also referred to as total acidity.

In another preferred embodiment of this invention, the tar-depleted aqueous liquid smoke composition has a total acid content of at least about 7 weight percent and most preferably a total acid content of at least about 9 weight percent. The total acid content of the tar-depleted aqueous liquid smoke is a value of the acid equivalent, since the analytical procedure for determining the total acid content of the tar-depleted aqueous liquid smoke provides a measure of the free acid plus the acid salts resulting from the partial neutralization. Total acid content is a qualitative measure of the staining power (previously defined) of not only tar-containing liquid smokes but also tar-depleted liquid smokes prepared therefrom by the present inventive method. As used herein, the total acid content of tar-depleted liquid smoke compositions is measured by a steam distillation recovery-titration procedure. This method is theoretically capable of quantifying the acids such as the acetate and formate, which are formed in the at least partially neutralized tar-depleted liquid smoke composition. From a reaction standpoint, the acid present in the aqueous liquid smoke (in free or salt form) remains constant during the controlled temperature neutralization. However, the recovery of these acids is only about 60% due to an inability to achieve complete azeotropic recovery within reasonable distillation volumes. At present, a procedure providing quantitative recovery of all acidic compounds from the tar-depleted liquid smoke regardless of state is not readily available. Under these circumstances, the results obtained by the steam distillation recovery-titration procedure are multiplied by a factor of 1.4 for conversion to the same total acid content basis used with tar-containing liquid smoke. Measurement of total acid, phenol and carbonyl contents in smoke treated casing is determined by the following procedures.

Determination of Total Acid Content for Tar-Depleted Liquid Smoke and Casings Treated Thereby This determination is made from the milliequivalents of sodium hydroxide (NaOH) required to neutralize the milliequivalents of acetic acid (HAc) which are distilled upon acidification of the at least partially neutralized tar-depleted liquid smoke composition or treated casing samples prepared from such compositions. "Milliequivalent" refers to the weight in grams of a substance contained in 1 ml. of a 1.0 normal solution. The procedure is as follows:

1. Weigh accurately 5 gm. of tar-depleted smoke or measure 100 sq. in. of tar-depleted liquid smoke treated casing into a tared 800 ml. Kjeldahl flask.
2. Add boiling chips and 100 ml. of 2% (v/v) $H_2SO_4$ to the flask, the reaction being $$2NaAc + H_2SO_4 \rightarrow 2HAc + Na_2SO_4$$

3. Place a 500 ml. Erlenmeyer flask containing 100 ml. of deionized water into an ice bath, and use this water to collect the distillate.
4. Connect the sample-containing Kjeldahl flask to the steam distillation apparatus.
5. Distill the sample until the distillate volume in the collecting Erlenmeyer flask reaches 500 ml.
6. Titrate 100 ml. of distillate with 0.1N NaOH to an end point pH of 7.0, the reaction being HAc + NaOH NaAc + $H_2O$
7. Calculate the measured acid content as weight of acetic acid on the basis that 1 ml. of 0.1N NaOH is equal to 6.0 mg. of HAc, so measured acid content in mg. = ml. of titrant × 6.0.
8. Total acid content in mg. = 1.4 × measured acid content in mg.
9. For liquid smoke, express the value of total acid content in mg. as the wt. % of the original liquid smoke sample. For casing, express the value of total acid content as mg. of acid per 100 square inches of casing surface.

The total acid contents of several tar-depleted liquid smoke compositions of this invention have been measured by this steam distillation recovery-titration procedure, and are listed in Table M. For comparison, the same procedure has been used to measure the total acid content of the as-is tar-containing liquid smokes from which these compositions were derived, and the results are also listed in Table M. It will be noted that the values are quite similar for the same type of liquid smoke, whether it be tar-containing or tar-depleted. For example, as-is Royal Smoke AA liquid smoke has a total acid content of 11.1% and tar-depleted Royal Smoke AA liquid smoke has a total acid content of 12.2%. For further comparison, as-is Royal Smoke AA liquid smoke, as measured by the dilution-titration procedure used by the manufacturer and outlined herein for tar-containing liquid smoke, has also been included in Table M. This value of 11.4% is also very similar to the values for Royal Smoke AA based on the steam distillation recovery-titration procedure.

TABLE M

Total Acid Content of As-Is and Tar-Depleted Liquid Smoke

| Smoke Type | Tar Content | Analytical Method | Total Acid Content in % |
|---|---|---|---|
| Royal Smoke AA | as-is | Dilution/Titration | 11.4 |
| Royal Smoke AA | " | Steam Distillation/Titration | 11.1 |
| Royal Smoke A | " | Steam Distillation/Titration | 10.2 |
| Royal Smoke B | " | Steam Distillation/Titration | 9.1 |
| Royal Smoke 16 | " | Steam Distillation/Titration | 9.8 |
| Charsol C-12 | " | Steam Distillation/Titration | 11.8 |
| Charsol X-11 | " | Steam Distillation/Titration | 10.5 |
| Charsol C-6 | " | Steam Distillation/Titration | 7.3 |
| Royal Smoke AA | Tar-Depleted | Steam Distillation/Titration | 12.2 |
| Royal Smoke A | Tar-Depleted | Steam Distillation/Titration | 11.2 |
| Royal Smoke B | Tar-Depleted | Steam Distillation/Titration | 8.7 |
| Royal Smoke 16 | Tar-Depleted | Steam Distillation/Titration | 11.2 |
| Charsol C-12 | Tar-Depleted | Steam Distillation/Titration | 11.8 |
| Charsol X-11 | Tar-Depleted | Steam Distillation/Titration | 11.2 |
| Charsol C-6 | Tar-Depleted | Steam Distillation/Titration | 7.6 |

Determination of Phenol and Carbonyl Content in Liquid Smoke-Treated Casings

The samples are prepared by measuring and steam distilling 0.129 to 0.194 m$^2$ (200 to 300 in $^2$) of casing external surface, as described in the procedure for determination of total acid content.

The reagents for the phenol determination are prepared with distilled water, as follows:
1. Color solution—Dissolve 100 mg. of N-2,6-trichloro-p-benzoquinoneimine in 25 ml. of ethanol, and refrigerate. For the test, dilute 2 ml. to 30 ml. with water.
2. Buffer, pH 8.3—Dissolve 6.1845 gm. of boric acid in 250 ml. of water. Dissolve 7.45 gm. of potassium chloride in 250 ml of water. Dissolve 0.64 gm. of NaOH in 80 ml. of water. Mix the three solutions together.
3. 1.0% NaOH—Dissolve 1.0 gm. of NaOH in water. Dilute to 100 ml.
4. Standard solution—Dissolve 0.200 gm. of dimethoxyphenol (DMP) in 2000 ml. water. Then dilute portions of this solution to provide standard solutions containing 1 ppm, 2 ppm, 4 ppm, 6 ppm, and 8 ppm of DMP.

The procedure for phenol determination is a modified Gibbs method, as described in Wild F, *Estimation of Organic Compounds*, 143, 90–94, University Press, Cambridge, 1953. In this procedure, the sequence is as follows:
1st—In a 25 ml. flask, mix the four constituents in the order listed: 5 ml. bufer pH 8.3 5 ml. casing distillate, standard, or water (blank)
1 ml. 1% NaOH 1 ml. dilute color reagent
2nd—Shake, stopper and place in dark for 25 minutes.
3rd—Read absorbance at 580 nm.
4th—Prepare a standard curve using absorbance as the abscissa and standard concentrations as the ordinate. Extrapolate concentration of DMP in casing distillates from this curve.
5th—Calculate mg DMP/100cm$^2$ casing using the following equation:

$$\frac{\text{ppm DMP (from std curve)} \times 500(\text{dilution}) \times 0.001 \text{ mg/}\mu\text{g} \times 100}{\text{area of original sample}} = \text{mg DMP/100 cm}^2$$

The reagents for the carbonyl determination are as follows:
1. Saturated solution of recrystallized 2,4-dinitrophenylhydrazine ("DNP") in carbonyl-free methanol
2. Concentrated HCl
3. 10% Alcoholic KOH—Dissolve 10 gm. KOH in 20 ml. distilled water and dilute to 100 ml. with carbonyl-free methanol.
4. Standard solutions—Dilute 1 ml. 2-butanone (methyl-ethyl-ketone) (MEK) to 2000 ml. with distilled water. Then dilute portions of this solution to provide standard solutions containing 0.8 ppm, 1.6 ppm, 2.4 ppm, 4.0 ppm, and 8.0 ppm of MEK.

The procedure for carbonyl determination is a modified Lappan-Clark method as described in the article "Colorimetric Method for Determination of Traces of Carbonyl Compounds," Anal. Chem., 23, 541,542 (1951). In this procedure, the sequence is as follows:
1st—In a 25 ml. flask, mix the three constituents in the order listed: 5 ml. of 2,4 DNP solution 5 ml. casing distillate, standard, or water (blank)
Note: casing distillate may require further dilution.
1 drop concentrated HCl
2nd—Digest the mixture for 30 minutes in 55° C. water bath.
3rd—After rapidly cooling the digested mixture to room temperature, add 5 ml. 10% alcoholic KOH, shake and let stand for 30 minutes.
4th—Read absorbance at 480 nm.
5th—Prepare a standard curve using absorbance as the abscissa and standard concentrations as the ordinate. Extrapolate concentration of MEK in casing distillates from this curve.
6th—Calculate mg MEK/100cm$^2$ casing using the following equation:

$$\frac{\text{ppm MEK (from std curve)} \times \text{(dilution factor)} \times 0.001 \text{ mg}/\mu\text{g} \times 100}{\text{area of original sample}} = \text{mg MEK}/100 \text{ cm}^2$$

Absorptive Power

It will be recalled that both the staining power and staining index measurement procedures involve chemical reaction, and apparently for this reason the values measured at ambient temperature decline under elevated temperature aging conditions. As demonstrated in Example IX, this decline is not an accurate indication of the smoke color produced in stuffed food products using casings aged after treatment with tar-depleted liquid smoke.

Under these circumstances, additional measurement procedures not involving chemical reaction have been used in this invention to determine the coloring capability of liquid smoke and the liquid smoke-treated casing. This measurement procedure for liquid smoke is termed "absorptive power" and the measurement procedure for liquid smoke-treated casing is termed "absorptive index".

In the procedure for measuring absorptive power, 10 mg. of liquid smoke (either tar-containing liquid smoke or tar-depleted liquid smoke) is placed in a disposable vial and 5 ml. of methanol is added thereto. The two components are mixed by inverting the vial, and the ultraviolet absorption value of the mixture is then measured at 340 nm. This particular wave length is selected because spectroscopy measurements with many liquid smokes indicate greatest linearity in this wave length region. Absorptive power measurements for various as-is liquid smokes are included in Table L. A plot of these absorptive power measurements as a function of total acid content or total solids content reveals an approximately linear relationship.

It should be noted that whereas tar content is a significant contributor to the absorptive power measurement, I have discovered that tar only contributes to the staining of food in a minor way, if at all. Thus, in commercially available as-is smokes, absorptive power includes a measurement of tar content and the color constituents such as carbonyls, phenols and acids. This means that absorptive power of as-is smokes and tar-depleted smokes may be used to rank them by smoke color ability. However, absorptive power of as-is liquid smoke cannot be numerically compared with the absorptive power of tar-depleted smokes of this invention because of the absorptive effect of tars. Unlike staining power, the absorptive power of liquid smoke does not decline with aging.

EXAMPLE XI

A series of absorptive power measurements was performed on various tar-depleted liquid smokes of this invention. In each instance the as-is liquid smoke was neutralized by the addition of NaOH flakes and the neutralization temperature was controllably maintained at 10°-15° C. These measurements are summarized in Table N.

TABLE N

| Type of Liquid Smoke | Absorptive Power | |
|---|---|---|
| | As-Is | Tar-Depleted |
| Royal Smoke AA | 0.51 | 0.40 |
| Royal Smoke A | 0.45 | 0.36 |
| Royal Smoke B | 0.35 | 0.33 |
| Charsol C-12 | 0.40 | 0.38 |
| Charsol C-6 | 0.22 | 0.22 |
| Charsol C-3 | 0.11 | 0.15 |

Table N should be interpreted in light of the preceding discussion relating to the effect of tar content on liquid smoke absorptive power. Inspection of Table N reveals that the absorptive power of a tar-depleted liquid smoke of this invention is generally somewhat lower than the absorptive power of the tar-containing as-is liquid smoke from which it is derived. This principle does not hold for Charsol C-6 and Charsol C-3 since these liquid smokes are very low in tar content to begin with.

Table N also demonstrates that the tar-containing liquid smokes useful in the practice of this invention have absorptive power values of at least 0.25 and that there are tar-containing liquid smokes such as Charsol C-3 having absorptive powers in the as-is form which do not satisfy this requirement. Table N further shows that the absorptive power of the tar-depleted liquid smoke compositions of this invention will have values which are above 0.2, and preferably, the absorptive power values will be about 0.3 or greater. It will also be recalled from Table L that Charsol C-3 has a very high light transmittance of about 98% because of its low total acid content and low total solids content, and controlled temperature neutralization does not significantly affect its light transmittance.

Absorptive Index

In the procedure for measuring absorptive index, 2 square inches 12.9 cm² of liquid smoke-treated casing are cut out after drying, and placed in 10 ml. of methanol. After one hour of soaking time, the methanol has extracted all of the smoke components out of the casing, and the ultraviolet absorption value of the resulting smoke component-containing methanol is determined at 340 nm. As with the absorptive power measurement, a 340 nm. wave length was selected because spectroscopy measurements with many liquid smoke extracts from liquid smoke treated casings indicate greatest correlation with smoke loadings in this region.

EXAMPLE XII

A series of absorptive index measurements was made on casings using three different types of tar-depleted liquid smoke prepared in accordance with this invention with neutralization to a pH of 6.0, and applied at different loadings to the exterior surface of non-fibrous frankfurter size gel stock casings in the Example II manner. The results of these experiments are summarized in FIG. 7, with Royal Smoke AA derived liquid smoke shown as a solid line, Charsol C-12-derived liquid smoke shown as a dash line, and Royal Smoke B-derived liquid smoke shown as a dash-dot-dash line.

Figure 7:
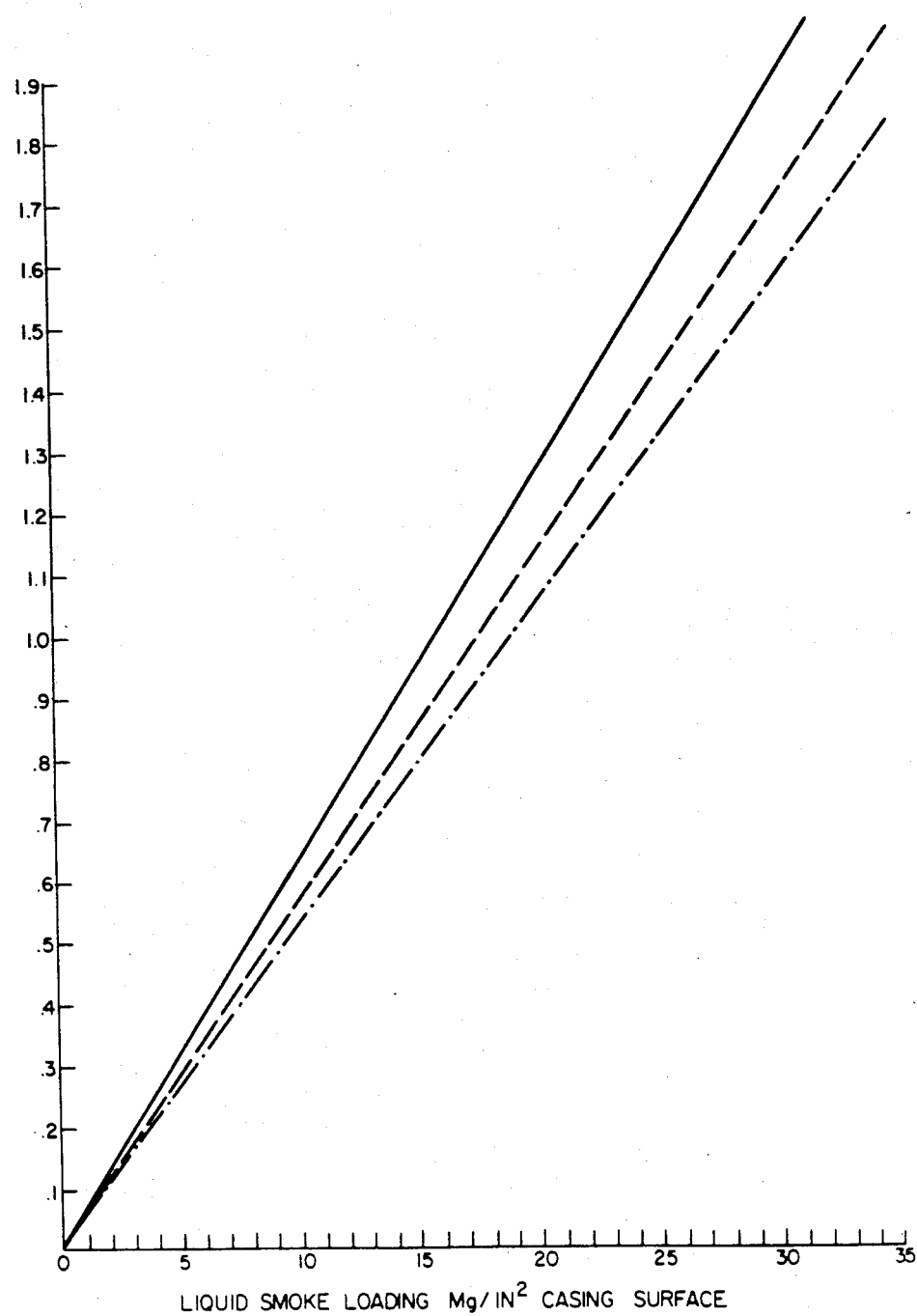
FIG. 7 is a graph showing ultraviolet absorptive index as a function of tar-depleted liquid smoke loading on a food casing external surface.

This Figure permits the practitioner to first select the desired extent of smoke color in terms of absorptive index, and then determine the required loading of a particular tar-depleted liquid smoke onto the casing to achieve this smoke color. In FIG. 7 1 mg/in$^2$ equals 0.155 mg/cm$^2$. The correlation between smoke color and absorptive index is illustrated in the following Example XIII.

EXAMPLE XIII

A series of colorimetric tests was performed using frankfurters prepared in the manner of Example III in non-fibrous casings treated with various liquid smokes including those on which Example XII is based. The results of these tests are summarized in Table O.

TABLE O

| | Casing Absorptive Index and Frankfurter Surface Light Intensity | | | |
|---|---|---|---|---|
| Type of Liquid Smoke | Sample No. | Loading Mg/cm$^2$ | Casing Absorptive Index | Frankfurter Light Intensity (-ΔL) |
| Royal Smoke AA tar-depleted, controlled temperature | 1 | 1.3 | 0.4 | 2.4 |
| | 2 | 0.93 | 0.2 | 2.1 |
| | 3 | 1.55 | 0.6 | 3.2 |
| | 4 | 0.62 | 0.19 | 1.4 |
| Royal Smoke AA, as-is tar-containing | 5 | 1.75 | 0.5 | 3.4 |
| Royal Smoke AA, tar-depleted, uncontrolled temperature | 6 | 1.5 | 0.4 | 2.4 |

In an attempt to quantify the desired light intensity changes needed to insure adequate color development, ΔL values were determined and are included in Table O. In this instance, the meat emulsion was 50% beef chuck and 50% regular pork trim, and ΔL values were considered too low if a 1.4 unit change in light intensity or less, occurred between L values measured on frankfurters produced within a non-smoked control casing compared to a liquid smoke treated casing.

Table O shows that if the absorptive index is less than about 0.2, the smoke loading is 4.0 mg./in$^2$ (0.62 mg/cm$^2$) or less. This level of smoke loading does not generally give a desired reduction in light intensity to the meat product, i.e., color development is generally considered to be insufficient. The medium reduction in light intensity for the frankfurters processed in a casing with a liquid smoke loading of 8.5 mg/in$^2$ (1.3 mg/cm$^2$ is quite satisfactory for most end uses, so that the corresponding absorptive index of at least 0.4 for the casing represents a preferred embodiment of the invention.

Table O also shows that embodiments of this invention have substantially the same staining ability as the original tar-containing liquid smoke. Comparison of Samples No. 3 and 5 shows that the tar content of the liquid smoke has very little influence on the staining ability of the liquid smoke. For practical purpos.es, the frankfurter light intensity of 3.2 for casing Sample No. 3 is substantially equivalent to the frankfurter light intensity of 3.4 for casing Sample No. 5.

Table O further shows that controlled temperature neutralization by the practice of this invention is unexpectedly superior to uncontrolled temperature neutralization since comparable frankfurter light intensity can be achieved at a lower liquid smoke loading on the casing. This is seen by comparing Samples No. 1 and 6.

It should be noted that many factors associated with the food emulsion and processing conditions can affect background color and hence L and ΔL values. For example, meat derives much of its color from myoglobin. The color associated with the myoglobin content of meat is known to be dependent upon chemical reaction of myoglobin and the cure which, in turn, is affected by processing conditions such as temperature, humidity, time and air velocity. Accordingly, the ΔL values in Table O are only relevant for these particular tests.

All of the previously described experiments relating to absorptive index were performed on non-fibrous cellulose casings of the same diameter promptly after liquid smoke treatment and drying. Other tests have shown that absorptive index is not significantly affected by variation in casing thickness. Still other tests have shown that absorptive index values for fibrous casing treated with tar-depleted liquid smoke according to this invention are about the same as the absorptive index values for non-fibrous cellulose casing with the same amount of smoke loading. By way of illustration, an absorptive index of about 0.5 was obtained with a fiber-reinforced cellulosic casing of 115 mm. diameter treated with tar-depleted liquid smoke derived from Royal Smoke AA at a loading of 10.1 mg./in$^2$ (1.57 mg/cm$^2$) of casing external surface. The absorptive index for a non-fibrous cellulose casing, treated with the same amount of liquid smoke in the same manner, is found from other tests to be about 0.5.

EXAMPLE XIV

A series of tests was performed on tar-depleted frankfurter size non-fibrous cellulose casings to demonstrate the minor effect of elevated temperature aging on absorptive index.

In these tests tar-containing as-is Royal Smoke AA liquid smoke was neutralized to a pH of 5.0 by the addition of NaOH flakes with the neutralization temperature being controllably maintained at 10°–15° C. Absorptive index measurements were obtained from the tar-depleted liquid smoke treated casing promptly after treatment and drying, and after storage periods of five and twelve weeks at ambient temperatures. Other samples of the same casing were maintained at 100° F. (38° C.) and absorptive index measurements were obtained at the same time intervals. These measurements are summarized in Table P.

TABLE P

| Absorptive Index of Aged Casing | |
|---|---|
| Time and Temperature | Absorptive Index |
| Initial at 21° C. | — |
| Five weeks at 21° C. | 0.37 |
| Twelve weeks at 21° C. | 0.37 |
| Five weeks at 38° C. | 0.35 |
| Twelve weeks at 38° C. | 0.36 |

Table P demonstrates that aging has no significant effect on absorptive index. For this reason, the absorptive index requirements of this invention are to be understood as based on measurements at ambient temperatures.

Although preferred embodiments of this invention have been described in detail, it is contemplated that modifications thereof may be made and some features may be employed without others, all within the spirit and scope of the invention. For example, it should be understood that as-is tar-containing liquid smokes which are advantageously treatable in the manner of this invention may be further concentrated by well-known techniques before or after treatment, and before use in accordance with this invention. This may be desirable if the practitioner wishes to apply a highly concentrated form of tar-depleted liquid smoke to a casing wall.

Other contemplated variations from the as-described embodiments of the invention include methods for separating the tar-containing liquid smoke into a tar-enriched liquid fraction and a tar-depleted liquid smoke fraction. In the Examples this was done by gravity decanting, but other methods may be used as will be understood by those skilled in the liquid-liquid separation art. These methods include, for example, liquid cycloning and centrifugal separation.

The tar-depleted liquid smoke treatment of a tubular food casing surface in the manner of this invention is preferably practiced under controlled environmental conditions wherein the presence of minute metal particles is minimized. This is an important requirement since metal wear particles (primarily iron, copper, brass) in contact with the casing react with the liquid smoke coating, resulting in auto-oxidation, discoloration and even cellulose degradation of the treated casing. The discoloration and cellulose degradation occur only in the immediate area of the metal contamination and seldom exceed 2–10 mm diameter in size. The cellulose degradation may sometimes be severe enough to cause casing breakage during stuffing or processing. The materials of construction of the treatment apparatus is an important factor in minimizing minute metal particles. These materials should be (1) of high wear resistance, and (2) nonreactive to the liquid smoke. It has been determined that certain metals and alloys are compatible with these stringent requirements. They are: certain aluminum alloys, chrome plating, tin alloys, and certain stainless steels. Care must also be used in other steps of casing manufacture and handling to minimize the presence of minute metal particles.

EXAMPLE XV

Four samples of tar-depleted liquid smoke were prepared with varying light transmittance values using the controlled temperature neutralization method. The as-is liquid smoke solution used was "Charsol C-12", and had an absorptive power of about 0.5 at a wave length of 340 nm, and a pH of about 2. Each of the four samples were prepared essentially as in Example I except each was neutralized to a different pH value to give a differing light transmittance value for each of the resulting tar-depleted liquid smoke solutions. The samples were neutralized by the addition of flake NaOH and the temperature was maintained during the neutralization within a temperature between about 10° C. to about 25° C. using refrigeration cooling coils. NaOH was used in such an amount to neutralize the samples to achieve light transmittance values of about 20%, 50%, 60% and 80%. This was achieved by adding an amount of NaOH to give the final pH indicated in Table Y. After the desired amount of NaOH was added, the tar precipitates were separated from the supernatant liquid by filtration to give a tar-depleted liquid smoke. The light transmittance was measured by diluting 1 ml of tar-depleted liquid smoke with 10 ml of water, and measuring transmittance relative to water on a spectrophotometer at a wave length of about 715 nm. A control sample was also made in the same manner, except the as-is smoke was neutralized to a pH of about 6.0. In Table Q are shown the pH and the light transmittance of the tar-depleted liquid smoke product.

TABLE Q

| Sample No. | pH | Light Trans. |
|---|---|---|
| 1 | 4.69 | 20.8% |
| 2 | 4.60 | 50.2% |
| 3 | 4.70 | 61.3% |
| 4 | 4.95 | 84.3% |
| Control | 5.92 | 92.% |

The above prepared samples were applied to a gel stock nonfibrous frankfurter casing (size No. 25) to give a loading of 15.5 grams per square meter of liquid tar-depleted liquid smoke using the apparatus and method described in Example V. The casings were dried as in Example V for about 3 minutes at a drying temperature between about 80° C. to about 120° C.

During the application of the tar-depleted liquid smoke, the casing was observed for tar spots thereon and the drying guides and the squeeze rolls of the drying unit were observed for tar buildup. The results of the observations are summarized in Table R.

TABLE R

| Sample | Light Trans. | Observation |
|---|---|---|
| 1 | 20.8% | Tar deposits formed immediately on casing. Heavy sticking on squeeze rolls. Tar deposits formed on drying guides. |
| 2 | 50.2% | Tar deposits formed immediately on casing. Slight sticking on squeeze rolls. Tar deposits formed on drying guides. |
| 3 | 61.3% | Tar deposits formed immediately on casing. No sticking on squeeze rolls. Tar deposits formed on drying guides. |
| 4 | 84.3% | Tar deposits formed on casing after five minutes. No sticking on squeeze rolls. Tar deposits formed on drying guides. |
| Control | 92% | No tar spots on casing. No tar deposits on drying guides or squeeze rolls. |

As can be seen from the above results, the problems due to the presence of tar in the tar-depleted liquid smoke solution, as reflected by the lower light transmittance values, become less as the tar content is lowered or the light transmittance value is increased. With tar-depleted liquid smoke with a light transmittance of about 20% the difficulties caused by the tars, in particular the sticking on the squeeze rolls, render the coating process inoperable and the composition is, therefore, unacceptable. As the light transmittance rises to about 50%, there are still difficulties, such as slight sticking on the rolls and commercially undesirable tar spots on the casing, but the application of the liquid smoke can still be carried out and a usable casing can still be made. At a light transmittance value of about 60%, a casing can be prepared that has few tar spots and is commercially more preferable, although spots are formed on the casing after extended periods of operation. At the higher light transmittance values of Sample 4 and the control, a casing is formed tht is commercially acceptable, there being no tar spots thereon, and the coating process can be carried out on a continuous basis without tar-buildup or sticking difficulties that would lead to shutting down of the process.

What is claimed is:

1. A method for preparing an aqueous liquid smoke composition comprising the steps of: providing a tar-containing aqueous liquid smoke solution at temperature below about 40° C. and having an absorptive power of at least about 0.25 at 340 nm. wave length; at least partially neutralizing said aqueous liquid smoke solution by contacting a high pH constituent therewith in sufficient quantity to raise the pH thereof to above about 4 to thereby form a tar-enriched fraction and a tar-depleted liquid smoke fraction; controlling the temperature of said aqueous liquid smoke solution during said neutralizing so that the solution temperature does not rise above about 40° C.; and separating said tar-enriched fraction and said tar-depleted liquid smoke fraction to recover the latter as said aqueous liquid smoke composition.

2. A method according to claim 1 in which said high pH constituent raises the partially neutralized smoke solution pH to about 6.

3. A method according to claim 1 in which the solution temperature is controlled during the at least partial neutralization so as not to rise above about 30° C.

4. A method according to claim 1 in which said high pH constituent raises the aqueous liquid smoke solution pH to about 6 and the solution temperature is controlled during partial neutralization so as not to rise above about 30° C.

5. A method according to claim 1 in which said liquid smoke solution has a total acid content of at least about 7 weight percent.

6. A method according to claim 1 in which said liquid smoke solution has a total acid content of at least about 9 weight percent.

7. A method according to claim 1 in which said liquid smoke composition has an absorptive power greater than about 0.2 to 340 nm. wave length.

8. A tar-depleted aqueous liquid smoke composition with smoke coloring and smoke flavoring capability, prepared by providing a tar-containing aqueous liquid smoke solution at temperature below about 40° C. and having an absorptive power of at least about 0.25 at 340 nm. wave length; at least partially neutralizing said aqueous liquid smoke solution by contacting a high pH constituent therewith in sufficient quantity to raise the pH thereof to a a level above about 4 to thereby form a tar-enriched liquid fraction and a tar-depleted liquid smoke fraction; controlling the temperature of said liquid smoke solution during said neutralizing so that the solution temperature does not rise above about 40° C.; and separating said tar-enriched fraction and said tar-depleted liquid smoke fraction to recover the latter as said aqueous liquid smoke composition, with said neutralizing and the simultaneous temperature controlling steps being performed so as to provide said aqueous liquid smoke composition with a light transmittance of at least 50%.

9. A tar-depleted aqueous liquid smoke composition according to claim 8 in which said composition has a total acid content of at least about 7 weight percent.

10. A tar-depleted aqueous liquid smoke composition according to claim 8 in which said composition has a total acid content of at least 9 weight percent.

11. A tar-depleted aqueous liquid smoke composition according to claim 8 in which said high pH constituent raises the aqueous liquid smoke solution pH to about 6.

12. A tar-depleted aqueous liquid smoke composition according to claim 8 in which the solution temperature is controlled during the at least partial neutralization so as not to rise above about 30° C.

13. A tar-depleted aqueous liquid smoke composition according to claim 8 in which said high pH constituent raises the aqueous liquid smoke solution pH to about 6 and the solution temperature is controlled during partial neutralization so as not to rise above about 30° C.

* * * * *